(12) United States Patent
Ahn et al.

(10) Patent No.: US 9,392,571 B2
(45) Date of Patent: Jul. 12, 2016

(54) METHOD FOR MEASURING POSITION IN M2M SYSTEM AND APPARATUS THEREFOR

(71) Applicant: LG ELECTRONICS INC., Seoul (KR)

(72) Inventors: Hongbeom Ahn, Seoul (KR); Seongyun Kim, Seoul (KR); Heedong Choi, Seoul (KR); Seungmyeong Jeong, Seoul (KR); Seungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/893,871

(22) PCT Filed: Jun. 12, 2014

(86) PCT No.: PCT/KR2014/005179
§ 371 (c)(1),
(2) Date: Nov. 24, 2015

(87) PCT Pub. No.: WO2014/200292
PCT Pub. Date: Dec. 18, 2014

(65) Prior Publication Data
US 2016/0112981 A1    Apr. 21, 2016

Related U.S. Application Data

(60) Provisional application No. 61/833,937, filed on Jun. 12, 2013, provisional application No. 61/900,406, filed on Nov. 6, 2013, provisional application No. 61/926,399, filed on Jan. 13, 2014.

(51) Int. Cl.
*H04W 24/00* (2009.01)
*H04W 64/00* (2009.01)
(Continued)

(52) U.S. Cl.
CPC .............. *H04W 64/00* (2013.01); *H04W 4/005* (2013.01); *H04W 4/02* (2013.01)

(58) Field of Classification Search
None
See application file for complete search history.

(56) References Cited

U.S. PATENT DOCUMENTS

2001/0048746 A1   12/2001   Dooley
2004/0008138 A1   1/2004    Hockley, Jr. et al.
(Continued)

FOREIGN PATENT DOCUMENTS

| KR | 10-2008-0034152 A | 4/2008 |
|---|---|---|
| KR | 10-1026286 B1 | 3/2011 |
| KR | 10-1062635 B1 | 9/2011 |

*Primary Examiner* — Dominic Rego
(74) *Attorney, Agent, or Firm* — Birch, Stewart, Kolasch & Birch, LLP

(57) ABSTRACT

The present invention relates to a method for enabling a machine-to-machine (M2M) gateway to measure the position of an M2M device, and an apparatus therefore, and the method includes the steps of: receiving a request for generating a first resource representing the way of obtaining positional information form a first M2M device; if the generation request contains the information for indicating commonly based positional measurement, determining the device closest to the first M2M device; and setting the positional information of the closest device as the positional information for the first m2M device, wherein if the M2M gateway does not have network topological information, or at least one M2M device connected to the m2M gateway does not have positional information, the M2M topological information, and the at least one M2M device connected to the M2M gateway has positional information, the device having the minimum number of hops from the first M2M device among the at least one M2M device is determined as the closest device, and the first resource represents a data structure capable of being uniquely addressed using address information.

18 Claims, 16 Drawing Sheets

(51) Int. Cl.
*H04W 4/00* (2009.01)
*H04W 4/02* (2009.01)

(56) References Cited

U.S. PATENT DOCUMENTS

| | | | |
|---|---|---|---|
| 2007/0010261 A1 | 1/2007 | Dravida et al. | |
| 2007/0279237 A1 | 12/2007 | Julian et al. | |
| 2008/0114943 A1* | 5/2008 | Holt | H04L 67/10 711/147 |
| 2009/0160711 A1 | 6/2009 | Mehta | |
| 2010/0137021 A1* | 6/2010 | Sharret | H04W 88/04 455/550.1 |
| 2012/0115473 A1* | 5/2012 | Kho | H04W 4/20 455/435.1 |
| 2013/0046841 A1* | 2/2013 | Park | H04W 4/08 709/206 |
| 2013/0160140 A1* | 6/2013 | Jin | H04W 12/02 726/27 |
| 2013/0294285 A1* | 11/2013 | Zhang | H04W 4/005 370/254 |
| 2013/0346504 A1* | 12/2013 | Huang | H04L 12/185 709/204 |
| 2014/0064232 A1* | 3/2014 | Chang | H04W 48/18 370/329 |

* cited by examiner

FIG. 9
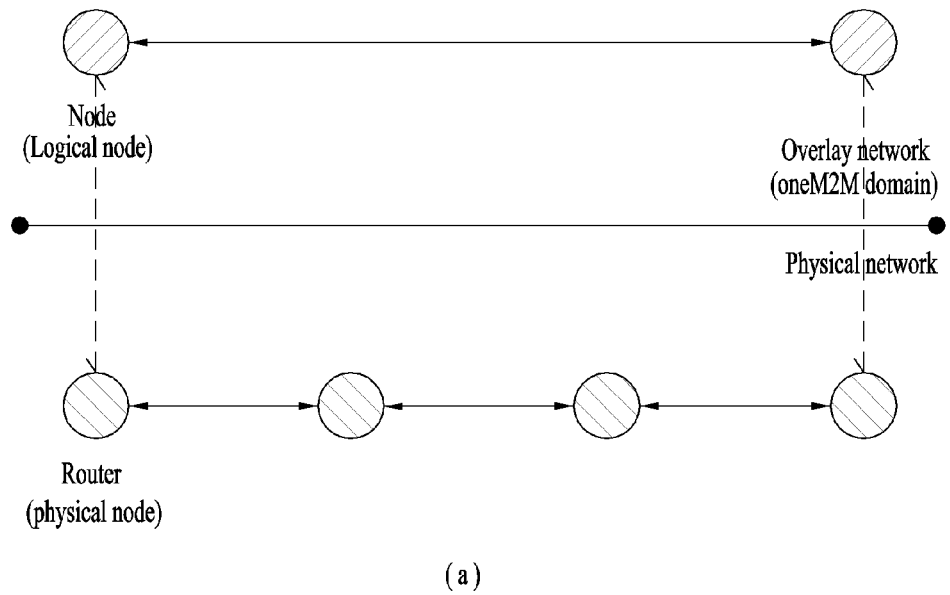
(a)
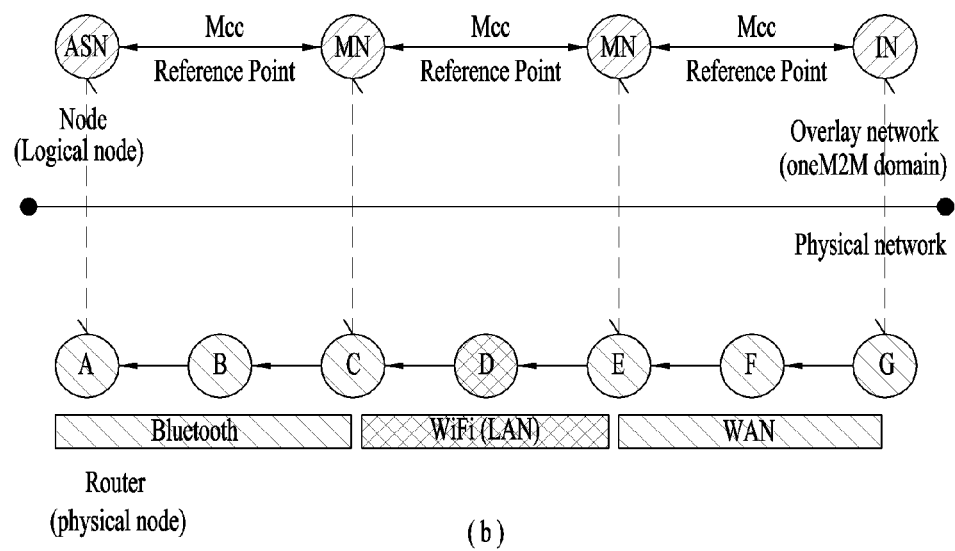
(b)

FIG. 15
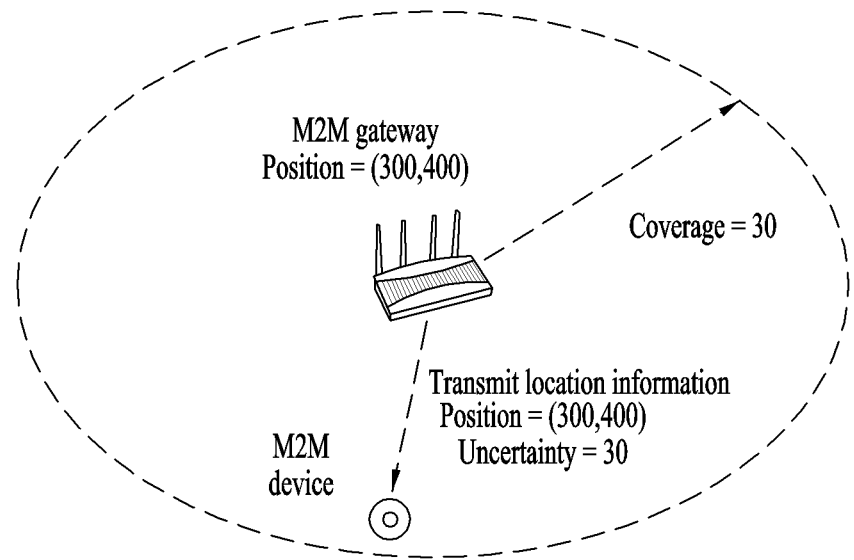
(a)
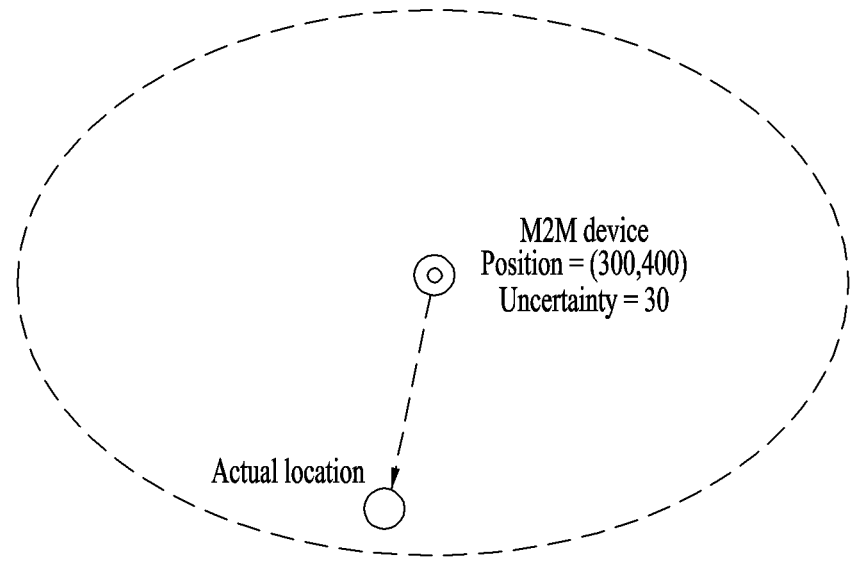
(b)

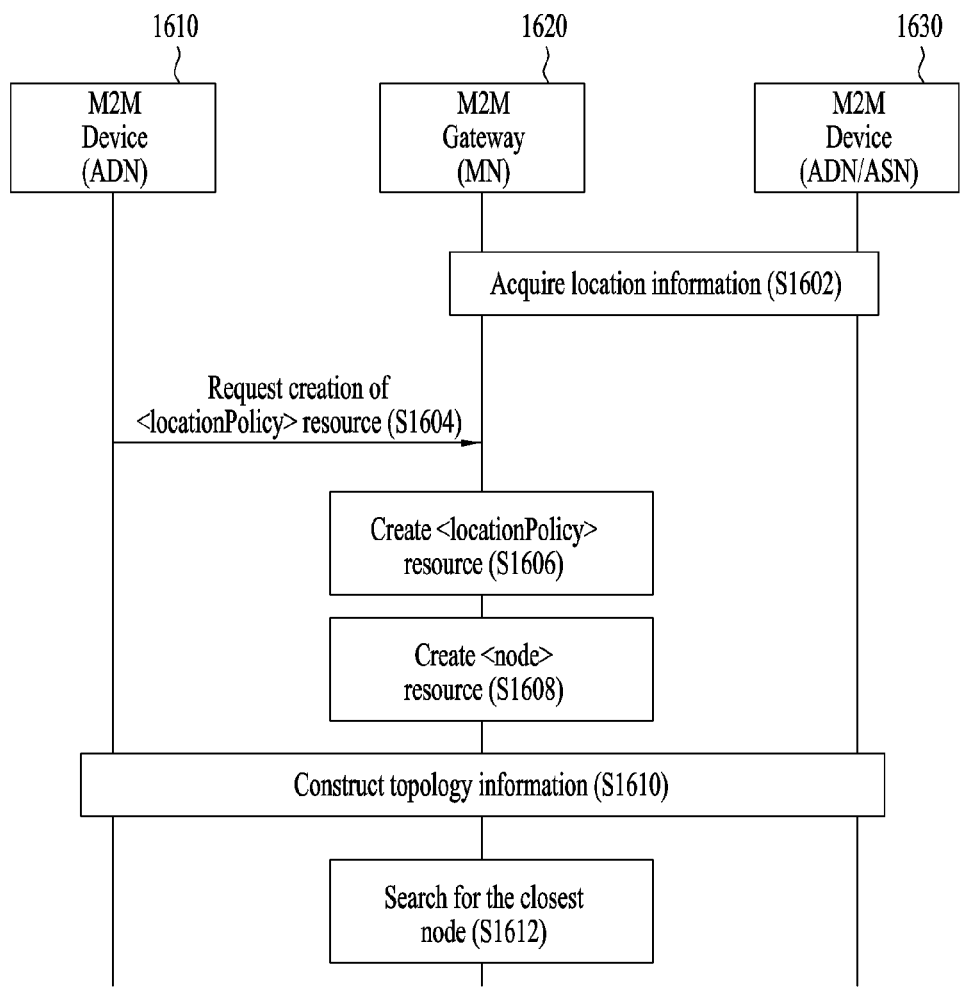

FIG. 16

\* If topology information is not present or if the node having location information is not present, MN node 1620 is determined to be the closest node, and the location of the MN node is set to the location of M2M device 1610.

\*\* If topology information is present or if the node having location information is present, the node having a minimum number of hops on the basis of topology information from among a plurality of nodes having location information is determined to be the closest node, and the location of the closest node is set to the location of M2M device 1610.

METHOD FOR MEASURING POSITION IN M2M SYSTEM AND APPARATUS THEREFOR

CROSS REFERENCE TO RELATED APPLICATIONS

This application is the National Phase of PCT International Application No. PCT/KR2014/005179, filed on Jun. 12, 2014, which claims priority under 35 U.S.C. 119(e) to U.S. Provisional Application No. 61/833,937, filed on Jun. 12, 2013, U.S. Provisional Application No. 61/900,406, filed on Nov. 6, 2013, and U.S. Provisional Application No. 61/926,399, filed on Jan. 13, 2014, all of which are hereby expressly incorporated by reference into the present application.

TECHNICAL FIELD

The present invention relates to a Machine-to-Machine (M2M) system. More specifically, the present invention relates to a method and apparatus for measuring a location of a M2M device in the M2M system.

BACKGROUND ART

Recently, interest in M2M (machine-to-machine) communication is rising. The M2M communication corresponds to communication performed between machines without a human involvement. The M2M communication is also called MTC (machine type communication) or IoT (internet of things) communication. A terminal used for the M2M communication is called a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system can be constructed. Such a service as object tracking, power metering, automatic payment system, healthcare service, remote controlling, and the like can be provided by the M2M system.

The present invention relates to a M2M system.

DISCLOSURE

Technical Problem

An object of the present invention is to provide a method and apparatus for efficiently measuring a location in a machine-to-machine (M2M) system.

Another object of the present invention is to provide a method and apparatus for efficiently measuring the location of a M2M device having no location information in a M2M system.

Another object of the present invention is to provide a method and apparatus for efficiently obtaining location information based on sharing in a M2M system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, provided herein is a method for measuring location of a machine-to-machine (M2M) device by a M2M gateway, the method comprising: receiving a create request for a first resource indicating a scheme of obtaining location information from a first M2M device; determining a device located closest to the first M2M device, when the create request includes information indicating sharing-based location measurement; and setting location information of the closest device to location information for the first M2M device, wherein, if the M2M gateway does not have network topology information or if at least one M2M device connected to the M2M gateway does not have location information, the M2M gateway is determined to be the closest device, if the M2M gateway has the network topology information and the at least one M2M device connected to the M2M gateway has the location information, a device having a minimum number of hops from the first M2M device from among the at least one M2M device is determined to be the closest device, and the first resource indicates a data structure that is uniquely addressable using address information.

In another aspect of the present invention, provided herein is a machine-to-machine (M2M) gateway for performing location measurement of a M2M device, comprising: a network interface unit; and a processor, wherein the processor controls the network interface unit to receive a create request for a first resource indicating a scheme of obtaining location information from a first M2M device, determines a device located closest to the first M2M device when the create request includes indication information of sharing based location measurement, and sets location information of the closest device to location information for the first M2M device, wherein, if the M2M gateway does not have network topology information or if at least one M2M device connected to the M2M gateway does not have location information, the M2M gateway is determined to be the closest device, if the M2M gateway has the network topology information and the at least one M2M device connected to the M2M gateway has the location information, a device having a minimum number of hops spaced apart from the first M2M device from among the at least one M2M device is determined to be the closest device, and the first resource indicates a data structure that is uniquely addressable using address information.

Preferably, if there are at least two devices each of which has the minimum number of hops, a device having the latest location information is determined to be a device located closest to the first M2M device.

Preferably, the setting the location information includes: storing location information of a device located closest to the first M2M device in a second resource for storing location information of the first M2M device.

Preferably, the network topology information indicates not only a list of M2M devices connected to the M2M gateway but also physical connection between the M2M devices connected to the M2M gateway.

Preferably, the first M2M device does not have positioning determination capability and network-based positioning capability.

Advantageous Effects

According to the present invention, it is possible to efficiently measure a location in a M2M system.

According to the present invention, it is possible to efficiently measure the location of a M2M device having no location information in a M2M system.

According to the present invention, it is possible to efficiently obtain location information based on sharing in a M2M system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 9 exemplarily shows an overlay network structure and a physical network structure of a M2M system.

FIG. 15 exemplarily illustrates a positioning procedure (location measurement procedure) of a M2M gateway according to the present invention.

FIG. 16 is a flowchart illustrating a positioning procedure (location measurement procedure) according to the present invention.

DETAILED DESCRIPTION OF THE INVENTION

Figure 1:
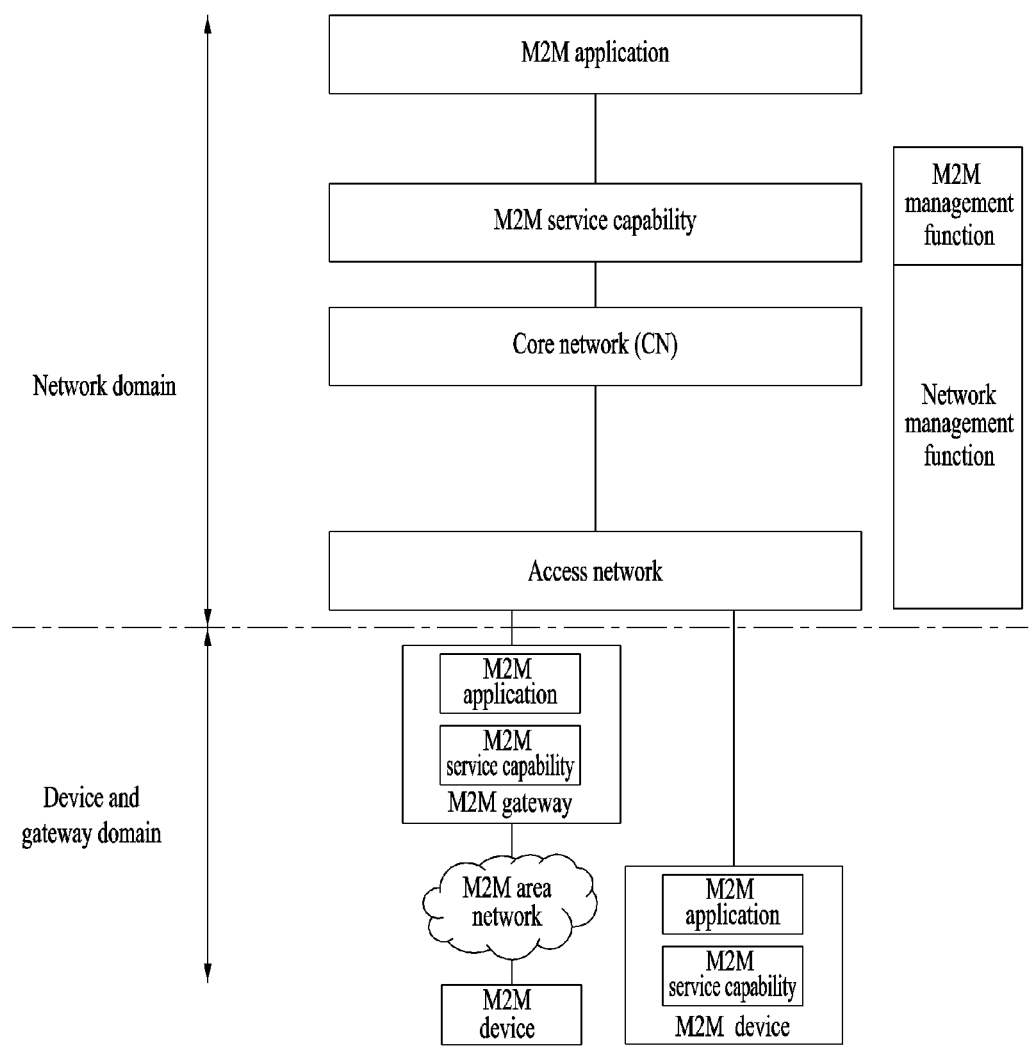
FIG. 1 shows an example of a M2M system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from a M2M server and/or a M2M gateway by communicating with the M2M server and/or the M2M gateway. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. The M2M server refers to a server for M2M communication, and may be implemented as a fixed station or a mobile station. The M2M server may communicate a M2M device and/or another M2M server to exchange data and control information. A M2M gateway refers to an apparatus serving as a connection point entering one network to another network when a network to which a M2M device is attached and a network to which a M2M server is attached are different from each other. Further, the M2M gateway may perform a function as a M2M device. In addition, the M2M gateway may perform functions of aggregating messages (message aggregation), or receiving one message and forwarding the same message or changed message to M2M devices connected to the M2M gateway (message fanout). The term "M2M device" may be used to refer to a M2M gateway or a M2M server, and thus the M2M gateway or the M2M server may be referred to as a M2M device.

In addition, in the present specification, the term "entity" may refer to a hardware such as a M2M device, a M2M gateway, or a M2M server, or the term "entity" may refer to a software component of M2M application layer or M2M (common) service layer as described below.

The present invention is hereinafter described focusing on a M2M system, but the present invention is not limited to the M2M system. For example, the present invention may be applied to a system in accordance with a client-server (or sender-responder) model in a same or similar manner.

FIG. 1 shows an example of a M2M system. FIG. 1 shows an example of a M2M system according to ETSI (European telecommunications standards institute) TS (technical specification).

The M2M system according to the ETSI TS defines a common M2M service framework for various M2M applications. A M2M application may indicate a software component implementing such a M2M service solution as e-health, city automation, a connected consumer, automotive and the like. The M2M system provides functions commonly necessary for implementing the various M2M applications and the commonly necessary functions can be called a M2M service or a M2M common service. If the M2M common service is used, a M2M application can be easily implemented without configuring a basic service framework again for each M2M application.

The M2M service is provided in a form of service capability (SC), the M2M application approaches to the SC (service capability) or a set of service capabilities (SCs) via an open interface and may use a M2M service or function provided by the SC (service capability). The SC may provide functions (e.g. device management, location, discovery, group management, registration, security, etc) constructing a M2M service. An SC entity (service capability entity) and an SC layer (service capability layer) may refer to a set of functions for a M2M service that may be used when a M2M application is provided on a service framework.

The SC (service capability) may be represented as xSC. In this case, x can be represented by one of N, G and D. The x indicates where the SC (service capability) exists among a network (and/or a server), a gateway and a device. For instance, NSC indicates SC (service capability) existing in a network and/or a server and GSC indicates SC (service capability) existing in a gateway.

A M2M application may exist in a network, a gateway or a device. The M2M application existing in the network or a server in a manner of being directly connected with the server can be called a M2M network application or can be simply called a NA (network application). For instance, the NA corresponds to software which is implemented in a manner of being directly connected with a server and may be able to perform a role of communicating with a M2M gateway or a M2M device and managing the M2M gateway and the M2M device. The M2M application existing in the device can be called a M2M device application or can be simply called a DA (device application). For instance, the DA corresponds to software which is implemented in a M2M device and may be able to deliver sensor information and the like to the NA. The M2M application existing in the gateway can be called a M2M gateway application or can be simply called a GA (gateway application). For instance, the GA may play a role of managing a M2M gateway and may be able to provide a M2M service or function (e.g. SC (service capability) or SCs (service capabilities)) to the DA. The M2M application is a common name for an application entity (AE) and an application layer.

Referring to FIG. 1, a M2M system architecture can be divided into a network domain and a device and gateway domain. The network domain can include functions for M2M system management and functions for network management. The functions for the M2M system management can be performed by a M2M application managing devices existing in the device and gateway domain and M2M SCs (service capabilities). The functions for the network management can be performed by a core network and an access network. Hence, in the example shown in FIG. 1, the core network and the access network provide connection between entities instead of performing a M2M function. M2M communication can be performed between M2M SCs (service capabilities) in the network domain and the device and gateway domain via the core network and the access network. A M2M application of each domain can give and take a signal or information via M2M SCs (service capabilities) of each domain.

The access network corresponds to an entity enabling the M2M device and gateway domain to communicate with the core network. Examples of the access network include xDSL (digital subscriber line), HFC (hybrid fiber coax), satellite, GERAN, UTRAN, e-UTRAN, wireless LAN, WiMAX and the like.

The core network corresponds to an entity providing such a function as IP (internet protocol) connection, service and network control, interconnection, roaming and the like. The core network includes a 3GPP (3$^{rd}$ generation partnership project) core network, an ETSI TISPAN (telecommunications and internet converged services and protocols for advanced networking) core network, a 3GPP2 core network and the like.

M2M SC (service capability) provides a M2M common service function (CSF) capable of being shared by various M2M network applications, exposes a M2M service via an open interface and enables M2M applications to use the M2M service. A layer including such M2M SC entities or M2M common service functions may be referred to as a M2M SCL (service capability layer).

A M2M application corresponds to an entity operating service logic and the entity capable of using M2M SCs (service capabilities) via an open interface. A M2M application layer indicates a layer including the M2M application and a related operational logic.

A M2M device corresponds to an entity operating a M2M device application via M2M SCs (service capabilities). The M2M device can directly communicate with a M2M server of a network domain and can communicate with the M2M server of the network domain via a M2M gateway. In case of being connected via the M2M gateway, the M2M gateway operates like a proxy. The M2M device can include a M2M application and/or M2M SCs (service capabilities).

A M2M area network provides connectivity between the M2M device and the M2M gateway. In this case, a network between the M2M gateway and a M2M server and a network between the M2M device and the M2M gateway may be different from each other. For instance, the M2M area network can be implemented using such a PAN (personal area network) technology as IEEE 802.15.1, Zigbee, Bluetooth, IETF ROLL, ISA 100.11a and such a local network technology as PLC (power line communication), M-BUS, wireless M-BUS, KNX and the like. In a non-limiting example, the M2M area network may be in a form of physical network connections. In another example, the M2M are network may be in a form of logical network connections.

The M2M gateway corresponds to an entity managing a M2M application via M2M SCs (service capabilities) and the entity providing a service to the M2M application. The M2M gateway performs a role of a proxy between a M2M device and a network domain and can perform a role of providing a service to an ETSI non-compliant M2M device. The M2M gateway may correspond to an entity equipped with a function of a gateway among M2M devices. The M2M gateway can include a M2M application and/or M2M SCs (service capabilities).

The M2M architecture shown in FIG. 1 is just an example and a name of each entity may vary. For instance, M2M SC (service capability) may be called a M2M common service function (CSF), and an SCL (service capability layer) may be called a common service layer (CSL) or a common service entity (CSE). A M2M application can be called an application entity (AE), and a M2M application layer may be simply called an application layer. Similarly, a name of each domain may vary as well. For instance, in one M2M system, a network domain may be called an infrastructure domain, and a device and gateway domain may be called a field domain.

As shown in FIG. 1, a M2M system can be comprehended as a layered structure including a M2M application layer and a M2M SC (service capability) layer for M2M communication.

Figure 2:
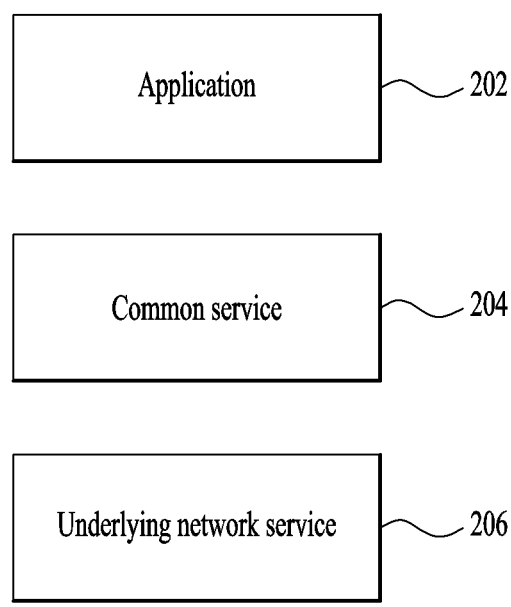
FIG. 2 shows an example of a layered structure of a M2M system.

FIG. 2 shows an example of a layered structure of a M2M system.

Referring to FIG. 2, a M2M system can include an application layer 202, a common service layer 204 and an underlying network services layer 206. As mentioned in the foregoing description, the application layer 202 corresponds to a M2M application layer and the common service layer 204 may correspond to a M2M SCL. The underlying network services layer 206 provides such services as device management, a location service and device triggering existing in a core network to the common service layer 204.

Figure 3:
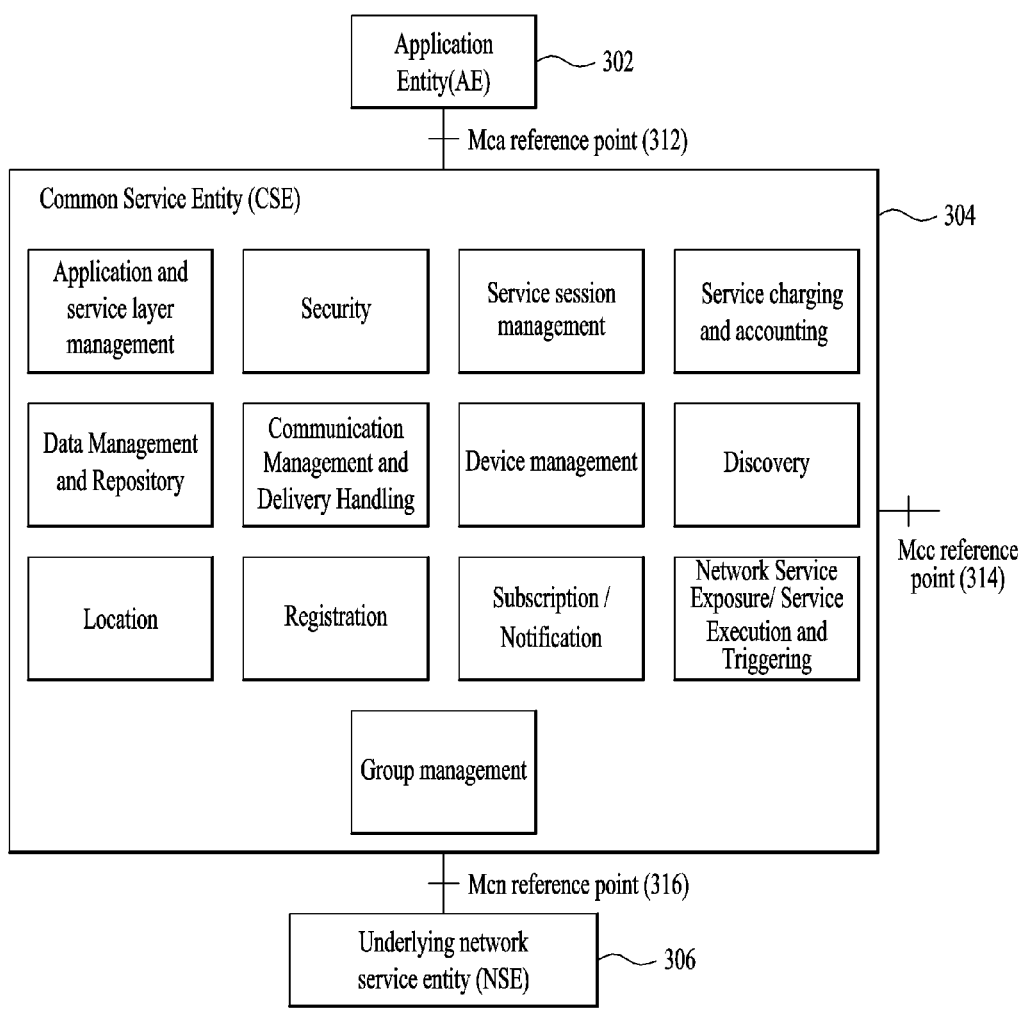
FIG. 3 shows an example of a functional architecture of a M2M system.

FIG. 3 shows an example of a functional architecture of a M2M system. In terms of functionality, M2M system architecture can include an application entity (AE) 302, a common service entity (CSE) 304, and an underlying network service entity (NSE) 306. Each of the entities 302/304/306 can communicate with each other via a reference point supported by the common service entity 304. The reference point plays a role in designating a communication flow between each of the entities 302/304/306. The reference point can be represented as Mcx and Mc means "M2M communications". In the present specification, a Mca reference point, a Mcc reference point and a Mcn reference point can be represented as Mca, Mcc and Mcn, respectively.

Referring to FIG. 3, a Mca reference point 312 designates a communication flow between the application entity (AE) 302 and the common service entity (CSE) 304. The Mca reference point 312 enables the AE 302 to use a service provided by the CSE 304 and enables the CSE 304 to communicate with the AE 302. The Mca reference point 312 may indicate an interface between a M2M application layer and a M2M common service layer (or entity).

A Mcc reference point 314 designates a communication flow between common service entities (CSEs) 304 different from each other. The Mcc reference point 314 enables the CSE 304 to use a service of a different CSE when the CSE 304 provides necessary functions. A service provided by the Mcc reference point 314 may be dependent on the functions supported by the CSE 304. The Mcc reference point 314 may indicate an interface between M2M common service layers.

A Mcn reference point 316 designates a communication flow between the CSE 304 and the underlying network service entity (NSE) 306. In order to make the CSE 304 provide required functions, the Mcn reference point 316 enables the CSE to use a service provided by the NSE 306. The Mcn reference point 312 may indicate an interface between the M2M common service layer and the M2M underlying network layer.

In the example shown in FIG. 3, the CSE 304 can provide various common service functions (CSFs). For instance, the CSE 304 can include at least one selected from the group consisting of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, and a subscription/notification function. The CSE 304 indicates an instance of the common service functions and provides a subset of the common service functions capable of being used and shared by M2M applications. The common service functions are schematically explained in the following.

Application and service layer management (ASM): provides a management function of AEs and CSEs. For instance, the ASM function configures functions of the CSEs, troubleshoots the functions of the CSEs and upgrades the functions. Moreover, the ASN function can upgrade a function of the AEs.

Communication management and delivery handling (CMDH): provides communication with different CSEs, AEs and NSEs. For instance, the CMDH function determines timing and a method of using a connection for CSE-to-CSE communication and can control specific requests to be delivered in a manner of being delayed.

Data management and repository (DMR): enables M2M applications to exchange and share data with each other. For instance, the DMR function collects great amount of data, aggregates the data with each other, convert the data into a specific format and can store the converted data.

Device management (DMG): manages a device function not only for a M2M gateway and a M2M device but also for devices existing in a M2M area network. For instance, the DMG function can perform application installation and configuration, firmware update, logging, monitoring, diagnostics, network topology management and the like.

Discovery (DIS): searches for information such as information and a resource within a given range and condition according to a request.

Group management (GMG): For instance, a group can be created in a manner of combining a resource and a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or a different CSE to register at a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to an AE or CSE.

Service session management (SSM): performs a role in managing a M2M session of a service layer for end-to-end communication.

Subscription/notification (SUB): when a change for a specific resource is subscribed, if the resource is changed, performs a role in notifying the change.

Figure 4:
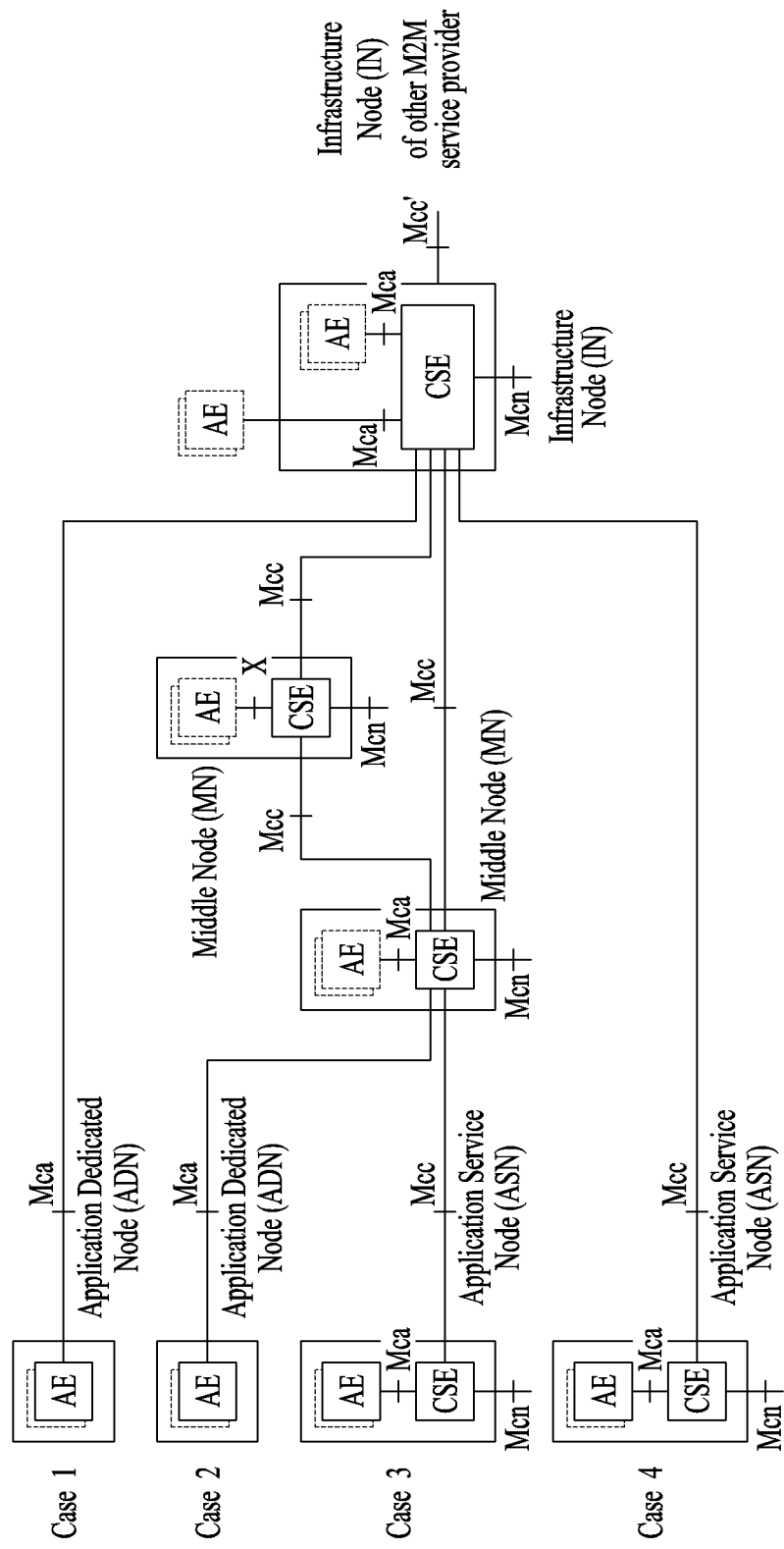
FIG. 4 is a diagram for an example of a M2M system configuration.

FIG. 4 is a diagram for an example of a M2M system configuration. In the present specification, a node corresponds to an entity including one or more M2M applications or an entity including one CSE and a M2M application equal to or greater than 0.

Although an application dedicated node (ADN) includes at least one or more application entities (AEs), the application dedicated node (ADN) may indicate a node not including a common service entity (CSE). The ADN can communicate with a middle node (MN) or an infrastructure node (IN) via a Mca. The ADN can be called a M2M device having a constrained capability. In this case, the M2M device having a constrained capability may correspond to a M2M device not including a common service layer or a common service entity (CSE). The M2M device having a constrained capability can be simply called a constrained M2M device.

An application service node (ASN) includes at least one or more common service entities (CSEs) and may indicate a node including at least one or more M2M application entities (AEs). The ASN can communicate with one middle node or an infrastructure node via a Mcc. The ASN can be called a M2M device.

A middle node (MN) may indicate a node including one common service entity (CSE) and M2M application entity (AE) equal to or greater than 0. The MN can communicate with an infrastructure node (IN) or a different middle node (MN) via a Mcc. Or, the MN can communicate with the IN/MN/ASN via the Mcc. Or, the MN can communicate with the ADN via the Mca. The MN can be called a M2M gateway.

An infrastructure node (IN) includes a common service entity (CSE) and may indicate a node including an application entity (AE) equal to or greater than 0. The IN can communicate with at least one or more middle nodes (MNs) and/or at least one or more ASNs. Or, the IN can communicate with one or more ADNs via a Mca. The IN can be called a M2M server.

In the present specification, a node may be referred to as a M2M device, and ASN, ADN, MN, IN may be referred to as a M2M device, a constrained M2M device, a M2M gateway, a M2M server, respectively.

Referring to FIG. 4, case 1 shows an example of communication performed between ADN 402 and IN 422. ADN 402 may correspond to a M2M device having a constrained capability. In this case, since ADN 402 does not include a CSE or a common service layer, the ADN can communicate with a CSE of IN 422 via the Mca. In this case, since ADN 402 does not include a CSE or a common service layer, the ADN is unable to store/share data generated by an AE or an application layer to/with another entity. Hence, in case 1, the data generated by the AE or the application layer of ADN 402 can be stored and shared in the CSE of IN 422.

Case 2 shows an example of communication performed between ADN 404 and MN 414. ADN 404 may also correspond to a M2M device having a constrained capability. Hence, the ADN can operate similar to an operation of case 1 except a point that ADN 404 is communicating with a CSE of MN 414. In particular, ADN 404 can communicate with the CSE of MN 414 via the Mca. And, since ADN 404 does not include a CSE or a common service layer, the ADN is unable to store data generated by an AE or an application layer. Hence, the data generated by the AE or the application layer of ADN 404 can be stored and shared in the CSE of IN 414.

Meanwhile, in case 2, MN 414 can communicate with IN 422 via MN 412. In this case, MN 414 and MN 412 can communicate with each other and MN 412 and IN 422 can communicate with each other via the Mcc. MN 414 can communicate with IN 422 without passing through MN 412.

Case 3 shows an example of communication performed between ASN 406 and MN 414. Unlike case 1 or case 2, since ASN 406 includes a CSE or a common service layer, data generated by an AE or an application layer of ASN 406 can be stored in the CSE or the common service layer of ASN 406. And, the AE of ASN 406 can communicate with a CSE of MN 414 via the CSE of ASN 406.

Case 4 shows an example of communication performed between ASN 408 and MN 414. Compared to case 3, a CSE of ASN 408 can directly communicate with a CSE of IN 422 without passing through the MN.

IN 422/424 can be located at an infrastructure domain or a network domain and can include one CSE and an AE equal to or greater than 0. INs 422/424 can communicate with each other via the Mcc.

Figure 5:
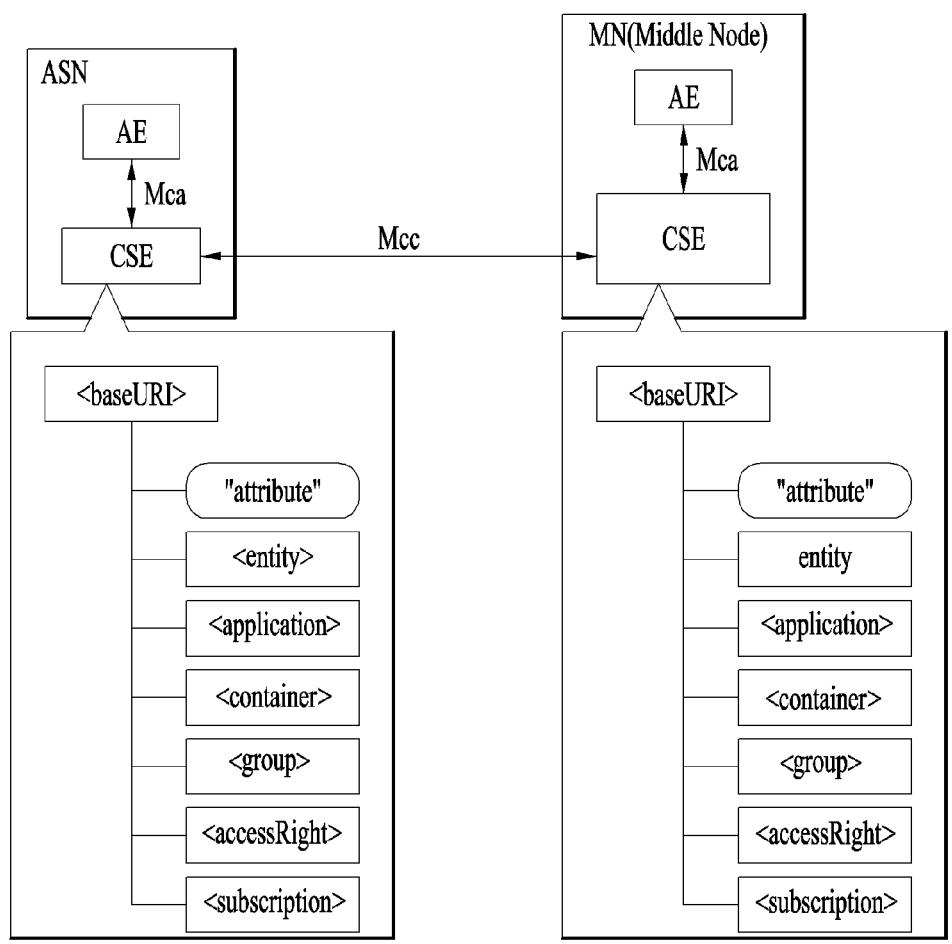
FIG. 5 is a diagram for an example of resources used in a M2M system.

FIG. 5 is a diagram for an example of resources used in a M2M system.

In a M2M system, an application entity (AE), a CSE, data and the like may be represented as a resource. In the M2M system, the resource indicates a uniquely addressable entity using a unique address (e.g., URI (universal resource identifier or uniform resource identifier)). In the M2M system, the resource may be represented as a specific data structure, and resources may be logically connected with each other. The resource may be managed by and stored to a CSE or common service layer. Hence, a M2M device, a M2M gateway, a CSE or a common service layer of a M2M server may include the resource. However, an AE or an application layer of the M2M system is unable to have the resource. For example, a resource may be represented as a tree structure. For example, a type of a root resource may be denoted by <baseURI> or <CSEBase>. A type of resource may be denoted by "<" and ">".

Various resources are defined in a M2M system. M2M applications can perform communication based on a resource which is an instantiation of a resource type. For instance, the resources can be used for a M2M service such as registration of an application, reading a sensor value and the like. When an instance of a resource type is created, unique address information (e.g., URI) is given to each resource. Similar to a root resource, each resource can include an attribute and a child resource. Each resource can be addressed using unique address information. A specific resource type defines child resources and attributes that a resource can have when the resource type is instantiated.

An attribute stores information on a resource itself and may not include a child resource. A child resource can include an attribute of the child resource and a child resource of its own. For instance, a child resource includes a remote CSE resource, an application entity resource, an access control resource, a container resource, a group resource, a subscription resource, and the like.

The remote CSE resource includes information of another CSE registered (connected) to a corresponding CSE. For example, a type of the remote CSE resource may be denoted by <entity> or <remoteCSE>.

Application entity resource: a resource located under an application entity resource of a root resource (e.g. <baseURI>/<application> or <CSEBase>/<AE>) or under a remote CSE resource of a root resource (e.g. <baseURI>/<entity> or <CSEBase>/<remoteCSE>). If the application entity resource exists under the application entity resource of the root resource (e.g. <baseURI>/<application> or <CSEBase>/<AE>), information of application entities registered (connected) to a corresponding CSE is stored. If the application entity resource exists under the remote CSE resource of the root resource (e.g. <baseURI>/<entity> or <CSEBase>/<remoteCSE>), information of application entities registered to a specific remote CSE is stored. For example, a type of an application entity resource may be denoted by <application> or <AE>.

Access control resource: a resource storing information related to an access right. Authorization may be performed using access right information included in the access control resource. For example, a type of an access control resource may be denoted by <accessRight> or <accessControlPolicy>.

Container resource: stores data generated per CSE or per AE. For example, a type of a container resource may be denoted by <container>.

Group resource: provides a function of enabling grouping various resources in one group and processing by group. For example, a type of a group resource may be denoted by <group>.

Subscription resource: performs a function of notifying a state change of a resource via a notification. For example, a type of a subscription resource may be denoted by <subscription>.

Figure 6:
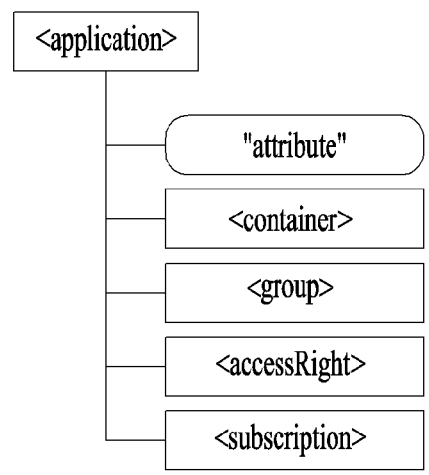
FIG. 6 is a diagram for an example of a resource for a specific M2M application.

FIG. 6 illustrates an example of a resource type for a specific M2M application. As described in the foregoing description, the resource for the specific M2M application can be stored in an application resource in a CSE or a common service layer of a M2M gateway. Similar to a general resource, a resource for a specific M2M application may have an attributes and a child resource. In the example of FIG. 6, a child resource is defined as a type (e.g. denoted by "<", ">") and an actual name is assigned and stored upon instantiation.

Figure 7:
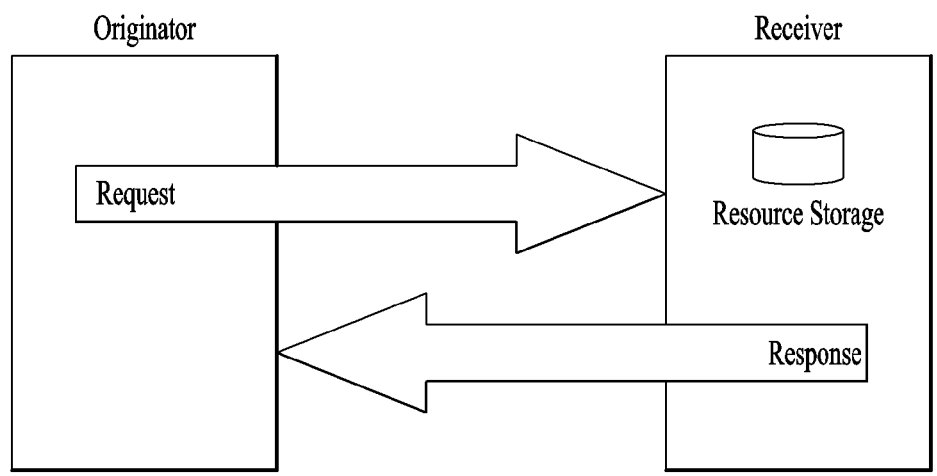
FIG. 7 exemplarily shows a communication flow of a general M2M system.

FIG. 7 illustrates a communication flow of a general M2M system. Generally, the operations of the M2M system may be carried out on the basis of data exchange. For example, in order to stop an operation of another device, a specific device may transmit a corresponding command to another device in a form of data. In order to store data in a device, a specific-format data structure is used, and this specific-format data structure is referred to as a resource. The resource may refer to an entity that can be addressed or accessed using a unique address (e.g., URI). The resource may be represented as a specific data structure.

Referring to FIG. 7, a Request and Response Scheme may be used for AE-to-CSE connection or CSE-to-CSE connection. An originator may transmit a request message to a receiver so as to request the stored resources from the receiver, and may receive a response message in response to the request message. Likewise, the receiver may receive a request message for requesting resources from the originator, and may transmit a response message to the originator upon receiving the request message. In this specification, the request message may also be referred to as a request, and the response may also be referred to as a response. The request messages to be transmitted from the originator to the receiver may have the following information.

op: a form of operation to be executed. op may be one of Create, Retrieve, Update, Delete, or Notify. In the present specification, information corresponding to op may be referred to as a command.
    to: URI of a target resource.
    fr: identification information (or ID) of an originator having generated the request.
    mi: meta information regarding the corresponding request.
    cn: content of a resource to be transferred.

If the corresponding request is successfully carried out, the response message may include the following information. The response message may include at least one of the following information, or may include only the result value (rs).

to: identification information (or ID) of an originator having generated the request.
    fr: identification information (or ID) of a receiver having received the request.
    mi: meta information regarding the request.
    rs: the result (e.g., Okay, Okay and Done, Okay and in progress) of the request.
    ai: additional information.
    cn: content of a resource to be transmitted.

If the corresponding request fails, the response message may include the following information.

to: an originator having generated the request.
    fr: ID of a receiver having received the request.
    mi: meta information regarding the request.
    rs: the result (e.g., Not Okay) of the request.
    ai: additional information In the present specification, an originator may represent an originating device (or CSE or AE in the originating device), and a receiver may represent a receiving device (or CSE or AE in the receiving device). A device (or CSE in the device) having a resource may be referred to as a hosting device (or hosting CSE).

In an example, an originator may use the scheme illustrated in FIG. 7 to create a resource on a receiver. In this case, the originator may transmit a resource create request message (e.g. CREATE request) to the receiver. The resource create request message may include the following information.

op: C (Create)
    to: URI of a parent of a creation target resource (a resource to be created)
    fr: originator ID
    cn: includes attribute information of the creation target resource, and optionally may include identification information of the creation target resource (e.g. name of the creation target resource).

When the receiver receives the resource create request message, the receiver checks whether the originator has been authenticated. Since information (e.g. access rights or access control policy) about the creation target resource is not yet known to the receiver, the receiver may determine whether to create the resource by authenticating the originator. If the originator has been authenticated, creation of the resource may be allowed. Further, if the resource create request message includes identification information of the creation target resource, the receiver verifies whether the identification information of the creation target resource already exists in the resource structure of the receiver. If valid identification information is not provided (e.g. the identification information of the resource to be created is duplicated), the receiver may allocate identification information of the creation target resource. Likewise, if the resource create request message does include identification information of the creation target resource, the receiver may allocate identification information of the creation target resource.

When the receiver has successfully created the creation target resource, the receiver may transmit a response message including the following information to the originator.

to: originator ID
    fr: receiver ID
    cn: URI and/or content of the created resource In another example, the originator may use the procedure shown in FIG. 7 to retrieve information (e.g. attribute information) about a resource on the receiver. In this case, the originator may transmit a retrieve request message (e.g. RETRIEVE request) to the receiver to retrieve the information (e.g. attribute information) about the resource on the receiver. The originator may retrieve all or part of attributes in the target resource of the receiver by using the retrieve request message. The retrieve request message may include the following information.

op: R (Retrieve)
    to: URI of a parent of a retrieve target resource (a resource to be retrieved)
    fr: originator ID When the receiver receivers the retrieve request message from the originator, the receiver verifies whether the retrieve target resource exists with reference to the URI of the retrieve target resource, and checks whether the originator has permission for retrieving with respect to the retrieve target resource. If the retrieve target resource does not exist or if the originator does not have proper permission for retrieving, the receiver may transmit an error through a response message. On the other hand, if the retrieve target resource exists and if the originator has proper permission for retrieving, the receiver may transmit a response message. The response message may include the following information.

to: originator ID
    fr: receiver ID
    cn: content of the retrieve target resource In still another example, the originator may use the procedure shown in FIG. 7 to update attribute information in a specific resource on the receiver. In this case, the originator may transmit an update request message (e.g. UPDATE request) to the receiver. The originator may update the attribute information of the specific resource to a new value on the receiver through the update request message. The update request message may include the following information.

op: U (Update)
    to: URI of an update target resource (a resource to be updated)
    fr: originator ID
    cn: information to be updated in the update target resource When the receiver receives the update request message, the receiver verifies whether the update target resource exists with reference to URI of the update target resource, and checks whether the originator is authorized to perform modifying the target resource. If the update target resource exists and the originator has been properly authorized, the receiver may update the update target resource by the information to be updated (e.g. cn). If the target resource has been successfully updated, the receiver may transmit a response message to the receiver. The response message may include the following information.

to: originator ID
    fr: receiver ID
    cn: the result of operation

In still another example, the originator may use the procedure shown in FIG. 7 to delete a specific resource on the receiver. In this case, the originator may transmit a delete request message (e.g. DELETE request) to the receiver. The delete request message may include the following information.

op: D (Delete)
    to: URI of a delete target resource (a resource to be deleted)
    fr: originator ID When the receiver receives the delete request message, the receiver verifies whether the delete target resource exists with reference to URI of the delete target resource, and checks whether the originator is authorized to delete the target resource. If the target resource does not exist or if the originator has not been authorized, the receiver may transmit an error through a response message. On the other hand, if the target resource exists and if the originator has properly authorized, the receiver may transmit a response message including the following information.

to: originator ID
    fr: receiver ID
    cn: the result of operation

Figure 8:
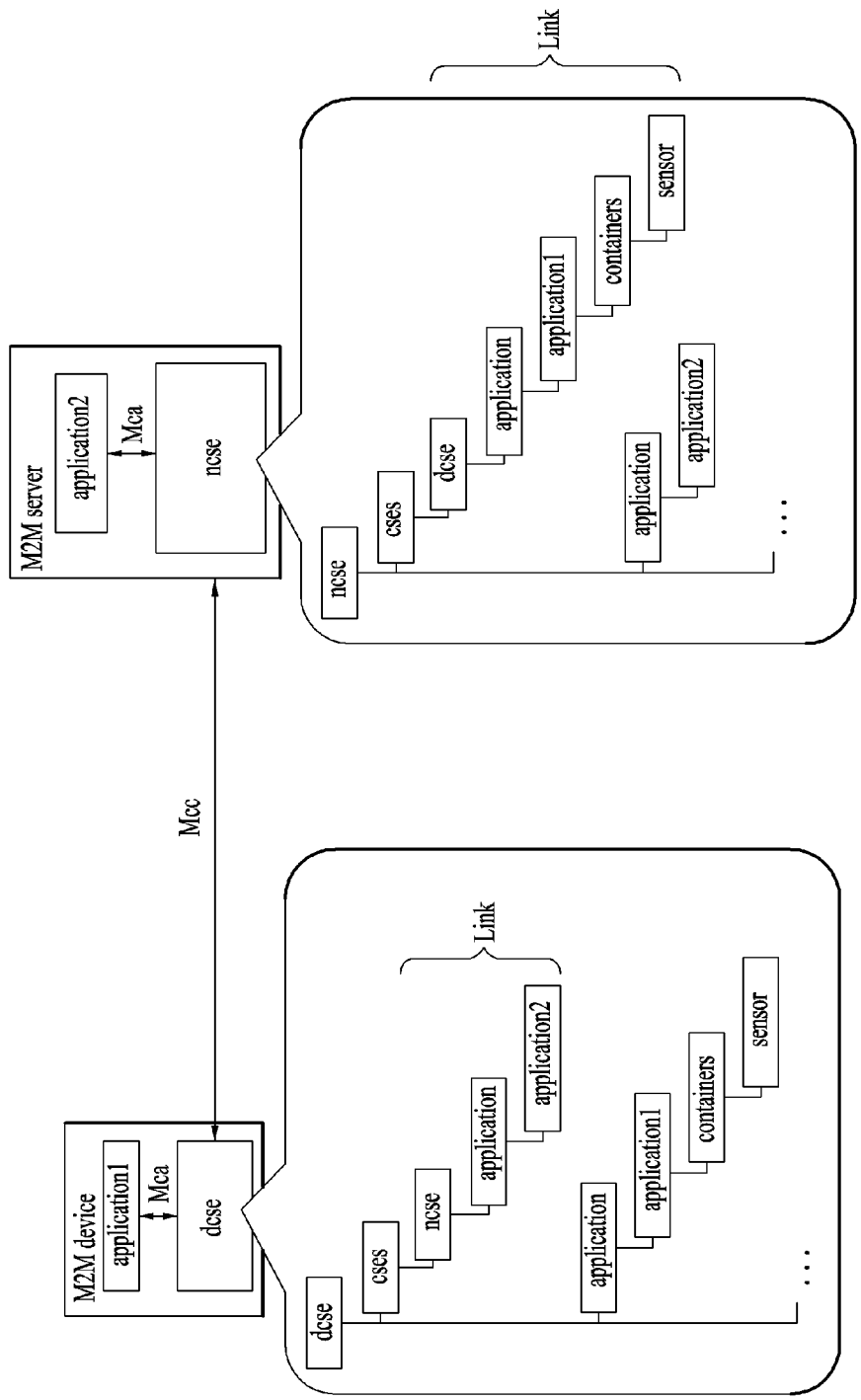
FIG. 8 exemplarily shows different entities interoperating with each other in an M2M system.

FIG. 8 exemplarily shows different entities interoperating with each other in a M2M system.

Referring to FIG. 8, AE (application2) registered in a M2M server interoperates with AE (application1) registered to a M2M device. For example, the M2M device may include a sensor which is a physical device, and may store information obtained from the sensor to CSE. The AE registered in IN may read a sensor value stored in the M2M device.

AE (application1) on the M2M device may read a value from the sensor and store the read value in the form of a resource (e.g. <container> resource) into a CSE (dcse) to which the AE (application1) registered. To this end, AE (application1) on the M2M device must first register to the CSE on the M2M device. As shown in FIG. 8, upon completion of registration, information related to the registered M2M application may be stored in the form of 'dcse/applications/application1' resource. For example, if a sensor value of the M2M device is stored by AE (application1) in a 'Container' resource under 'dcse/applications/application1' resource, AE (application2) having registered in the IN (Infrastructure Node) may access the corresponding value. In addition, in order for the AE (application2) to access the M2M device, the AE (application2) must register to the CSE (ncse) of the IN (Infrastructure Node). In the same manner as the AE (application1) registering to the CSE (dsce), information about AE (application2) is stored in 'ncse/applications/application2' resource. In addition, AE (application1) may communicate through a CSE (ncse) and a CSE (dcse) in the middle instead of directly communicating with the AE (application2). For this purpose, CSE (ncse) and CSE (dcse) must register to each other. If CSE (dcse) register to CSE (ncse), dsce related information (e.g., link) may be stored under 'ncse/cses/dcse' resource. As a result, AE (application2) may obtain a path through which the AE (application2) can access information of the AE (application1), such that the AE (application2) can read the sensor value through the corresponding path.

FIG. 9 exemplarily shows an overlay network structure and a physical network structure of a M2M system.

A M2M system (e.g., one M2M) may be composed of an overlay network structure. The overlay network may conceptually indicate a virtual network constructed on a physical network. A node within the overlay network structure may be connected with a virtual or logical link. For example, as described above, ADN, ASN, MN, IN, etc. may be mapped to the node, or a M2M device, constrained M2M device, M2M gateway, M2M server may be mapped to the node in oneM2M. Each link may pass through many physical links within the actual physical network, and may not consider a physical link for communication or for actual operation.

For example, referring to FIG. 9(a), a network may be seen as a physically four-hop connection in the physical network, while the network may be seen as a physically two-hop connection in the overlay network. The term 'hop' may represent a node-to-node connection in a network. Information representing a connection or network structure between nodes as a list of nodes may be referred to as topology information.

The reason why the actual physical network node is different from the overlay network node (i.e., overlay node) is as follows.

1. A node may be selected due to a functional difference. For example, a device configured to perform a special function in a physical network may be selected as an overlay node. Each device may be selected as a physical network node.

2. There may be a difference in upper nodes due to a difference in connected networks. For example, referring to FIG. 9(b), a physical network may be connected to Bluetooth, Wi-Fi, or WAN (Wide Area Network), and there may be a gateway per each network. For example, devices A, B, C may be physical nodes in underlying (or physical) network in case of a Bluetooth network, devices C, D, E may be physical nodes in underlying (or physical) network in case of Wi-Fi network, and devices E, F, G may be physical nodes in underlying (or physical) network in case of WAN. However, nodes B, D, F other than gateways may not be seen in the overlay network, and gateways A, C, E, G may be seen as nodes.

Meanwhile, the M2M common service layer may retrieve location information through a location server, or may retrieve location information through an application and store the retrieved location information. An entity that is present in a network of a network provider that owns a mobile communication network, provides assistance information needed to calculate the location of a user equipment (UE), or directly participates in location calculation may refer to as a location server. The operation for retrieving location information through an application may indicate an operation by which, when a node including an AE such as a M2M device (ASN) or constrained M2M device (ADN) obtains the location of the node using a scheme which is not standardized (e.g., a scheme other than delivering information in Mcc, Mca, or Mcn Reference Point), the node location is stored in a resource. For example, location information internally obtained through a GPS module may be stored in a resource.

If the M2M device attempting to obtain the location information is a constrained M2M device having limited resource or constrained capabilities, the following problems may occur.

If there is no connection to the location server: Generally, since the location server is a component of a core network of a mobile communication network, if the M2M device is not based on the mobile communication network (e.g., a device does not have universal subscriber identity module (USIM)), the M2M device may not connected to the location server.

If it is not possible to obtain the location information through the application: A device that is not capable of obtaining the location information through the application in the M2M system may be present. As described above, retrieving the location information through the application may indicate that the AE located in the node has its own logic and obtains the location information through device capability. For example, retrieving the location information through the application may represent a scheme of obtaining the location information by directly controlling a GPS module by an AE, or a scheme of obtaining the location information through a separate device or a logical scheme.

Therefore, if a specific device is not connected to the location server, and if the specific device is unable to obtain the location information through the application, the corresponding device may not obtain its own location information. For example, it is assumed that there is a sphygmomanometer (node) for providing the healthcare service. In this case, the corresponding sphygmomanometer need not be separately connected to the location server so as to reduce production costs, and may not have a separate device (such as GPS) or logical algorithm for location acquisition. However, assuming that the location information of the sphygmomanometer can be recognized, the service extensibility can be provided in an emergency situation.

Therefore, the present invention provides a method for determining the location information of a constrained M2M device when the M2M device of the M2M system cannot obtain its own location information.

First, the present invention proposes a resource structure for obtaining the location information in the M2M system. The present invention proposes not only a resource for storing the scheme of obtaining location information of a target UE, but also a resource for storing the location information of a target UE. The target UE may represent a node (or a device) which desires to obtain the location information.

Figure 10:
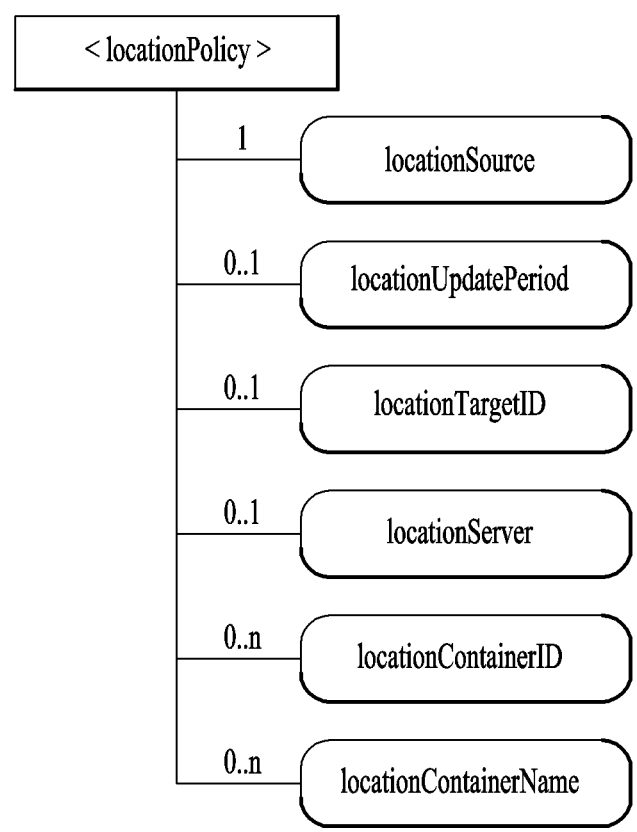
FIG. 10 exemplarily illustrates the resource for storing the location information of a target UE according to an embodiment of the present invention.

FIG. 10 exemplarily illustrates the resource for storing the location information of a target UE according to an embodiment of the present invention. Although the resource for storing a scheme of obtaining the location information of a target UE according to the present invention is referred to as a <locationPolicy> resource, it should be noted that another name may be used for the resource.

The <locationPolicy> resource may represent the scheme for obtaining and managing geographical location information of the M2M device. The <locationPolicy> resource does not store the location information therein, and may be used as a resource storing a scheme of storing and managing the location information. The actual location information may be stored in an <instance> resource which is a child resource of a <container> resource. The <container> resource may include attribute information (e.g., locationID) which contains URI of the <locationPolicy> resource as a linkage. The location common service function (LOC CSF) (see FIG. 3) may obtain the location information on the basis of attributes defined below the <locationPolicy> resource, and may then store the location information in the target <container>.

Table 1 exemplarily shows attributes associated with <locationPolicy> resource. In Table 1, R/W may indicate read/write (R/W) permission of the corresponding attribute, and may be one of READ/WRITE (RW), READ ONLY(RO), and WRITE ONLY (WO). In addition, "multiplicity" of Table 1 may represent how many times the corresponding attribute can occur in the <locationPolicy> resource. Therefore, if "multiplicity" is set to 1, only one attribute is mandatorily contained in the <locationPolicy> resource. If "multiplicity" is set to '1 . . . n', one or more attributes are mandatorily contained in the <locationPolicy> resource. If "multiplicity" is set to '0 . . . 1', one or fewer attributes may be optionally included. If "multiplicity" is set to '0 . . . n', one or more attributes may be optionally included. Table 1 is only exemplary, and attributes of the <locationPolicy> resource attribute may be different from those of Table 1 as necessary.

TABLE 1

| Attribute Name of <locationPolicy> | Multiplicity | R/W | Description |
| --- | --- | --- | --- |
| expirationTime | 1 | RW | Time/date after which the resource will be deleted by the hosting CSE. |
| parentID | 1 | RO | The identifier identifies the parent resource. |
| accessControlPolicyID | 1 . . . n | RW | The URI of an <accessControlPolicy> resource. The permissions defined in the <accessControlPolicy> resource that are referenced determine who is allowed to access the resource containing this attribute for a specific purpose (e.g. Retrieve, Update, Delete, etc.). If a resource type does not have an accessControlPolicyID attribute definition, then the accessControlPolicy for resources of that type are governed in a different way, for example, the accessControlPolicy associated with the parent may apply to a child resource that does not have an accessControlPolicyID attribute definition, or the permissions for access are fixed. Refer to the corresponding procedures to see how permissions are handled in such cases. If a resource type does have an accessControlPolicyID attribute definition, but the (optional) accessControlPolicyID |

TABLE 1-continued

| Attribute Name of <locationPolicy> | Multiplicity | R/W | Description |
|---|---|---|---|
| | | | attribute is not set, or it is set to a value that does not correspond to a valid, existing <accessControlPolicy> resource, or it refers to an <accessControlPolicy> resource that is not reachable (e.g. because it is located on a remote CSE that is offline or not reachable), then the system default access permissions shall apply. The system default access permissions grant all permissions (i.e. the full set of permissionsFlags) to the following permission holders depending on the prefix of URI of the resource. |
| creationTime | 1 | RO | Time/date of creation of the resource. |
| lastModifiedTime | 1 | RO | Last modification time/date of the resource. |
| locationSource | 1 | RW | Indicates the source of location information<br>    Network Based<br>    Device Based<br>    Sharing Based |
| locationUpdatePeriod | 0 ... 1 | RW | Indicates the period for updating location information. If the value is marked '0' or not defined, location information is updated only when a retrieval request is triggered. |
| locationTargetId | 0 ... 1 | RW | The identifier to be used for retrieving the location information of a remote Node and this attribute is only used in the case that location information is provided by a location server. |
| locationServer | 0 ... 1 | RW | Indicates the identity the location server. This attribute is only used in that case location information is provided by a location server. |
| locationContainerID | 0 ... n | RO | A URI of the <container> resource where the actual location information of a M2M Node is stored. |
| locationContainerName | 0 ... n | RW | A Name of the <container> resource where the actual location information of a M2M Node is stored. If it is not assigned, the Hosting CSE automatically assigns a name of the resource. |

The <locationPolicy> resource may be handled using the request/response scheme described in FIG. 7. Therefore, in order to create the <locationPolicy> resource in a hosting CSE, the AE may transmit a create request message to the hosting CSE. In order to retrieve the <locationPolicy> resource, the AE may transmit a retrieve request message to the hosting CSE. In order to update the <locationPolicy> resource, the AE may transmit an update request message to the hosting CSE. In order to delete the <locationPolicy> resource, the AE may transmit the delete request message to the hosting CSE.

The request message for creating the <locationPolicy> resource may include the following information.
  op: C or CREATE
  fr: Identifier (ID) of AE or CSE having generated the request
  to: URI of <CSEBase> resource
  cn: representation of the <locationPolicy> resource A response message to the request for creating the <locationPolicy> resource may include representation of the created <locationPolicy> resource, and attribute values shown in Table 1 are configured in the corresponding representation.

Figure 11:
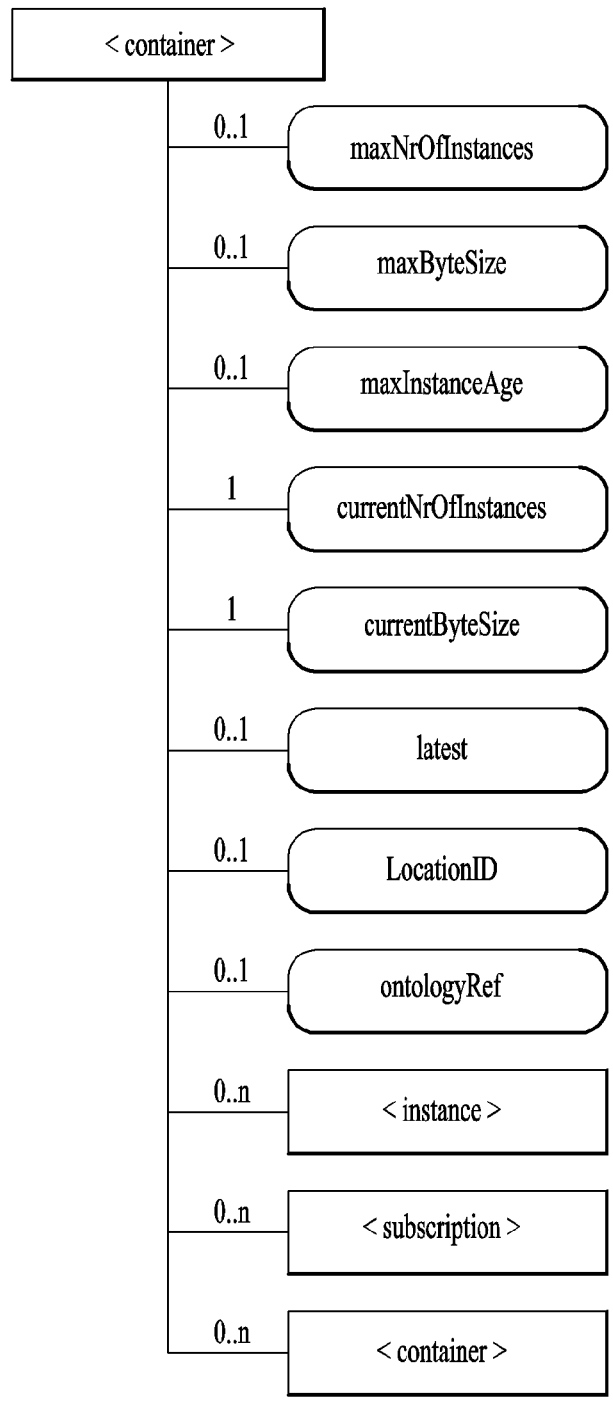
FIG. 11 exemplarily illustrates a resource for storing the location information of a target UE according to the present invention.

The retrieve request message of the <locationPolicy> resource may include the following information.
  op: R or RETRIEVE
  fr: Identifier of AE or CSE having generated the request
  to: URI of <locationPolicy> resource A response message to the request for retrieving the <locationPolicy> resource may include the following information.
  to: Originator ID
  fr: Receiver ID
  cn: Content of <locationPolicy> resource The update request message of the <locationPolicy> resource may include the following information.

op: U or UPDATE
  fr: Identifier of AE or CSE having generated the request
  to: URI of <locationPolicy> resource
  cn: Attribute information to be updated The response message to the request for updating the <locationPolicy> resource may include the following information.
  to: Originator ID
  fr: Receiver ID
  cn: Operation result The delete request message of the <locationPolicy> resource may include the following information.
  op: D or DELETE
  fr: Identifier (ID) of AE or CSE having generated the request
  to: URI of <locationPolicy> resource The response message to the delete request of the <locationPolicy> resource may include the following information.
  to: Originator ID
  fr: Receiver ID
  cn: Operation result FIG. 11 exemplarily illustrates a resource for storing the location information of a target UE according to the present invention. Although the resource for storing the location information of the target UE is referred to as the <container> resource for convenience of description, it should be noted that another name may be used for the resource.

The <container> resource may represent a container for a data instance. This resource may be used to share information between different entities, and may also be used to track data. The container resource may include attribute information and a child resource.

Table 2 exemplarily shows attributes associated with the <container> resource. In Table 2, R/W may represent read/ write (R/W) permission of the corresponding attribute, and may be one of READ/WRITE (RW), READ ONLY(RO), and WRITE ONLY (WO). In addition, "multiplicity" of Table 2 may represent how many times the corresponding attribute can occur in the <container> resource. Table 2 is only exemplary, and attributes of the <container> resource may be different from those of Table 2 as necessary.

specific M2M device (or node), and may include additional information for supporting the M2M operation. Specific information of a node (such as a memory and a storage unit) may be obtained by a legacy device management technology (e.g., Open Mobile Alliance (OMA) Device Management (DM) etc.) or other methods (e.g., Java Native Interface (JNI)).

TABLE 2

| Attribute Name of <container> | Multiplicity | R/W | Description |
|---|---|---|---|
| resourceType (rT) | 1 | RO | Resource Type. URI of the addressed resources are the concatenation of resource name tokens assigned at creation time by the Originator without indication of the resource type. |
| expirationTime (eT) | 1 | RW | Time/date after which the resource will be deleted by the hosting CSE. |
| accessRightID (aRI) | 0 . . . 1 | RW | The URI of an access rights resource. The permissions defined in the accessRight resource that are referenced determine who is allowed to access the resource containing this attribute for a specific purpose (e.g., Retrieve, Update, Delete etc.). |
| creationTime (cT) | 1 | RO | Time/date of creation of the resource. |
| lastModifiedTime (lMT) | 1 | RO | Last modification time/date of the resource. |
| maxNrOfInstances (mi) | 0 . . . 1 | RW | Maximum number of instances of <instance> child resources. |
| maxByteSize (mb) | 0 . . . 1 | RW | Maximum number of bytes that are allocated for a <container> resource for all instances in the container resource. |
| maxInstanceAge (ma) | 0 . . . 1 | RW | Maximum age of the instances of <instance> resources within the container. The value is expressed in seconds. |
| currentNrOfInstances (ni) | 1 | RO | Current number of instances in a <container> resource. It is limited by the maxNrOfInstances. |
| currentByteSize (nb) | 1 | RO | Current size in bytes of data stored in a <container> resource. It is limited by the maxNrOfBytes. |
| Latest (lt) | 0 . . . 1 | RO | Reference to latest instance, when present. |
| LocationID (LID) | 0 . . . 1 | RW | URI of the resource where the attributes/policies that define how location information are obtained and managed. This attribute is defined only when the <container> resource is used for containing location information. |
| ontologyRef (oR) | 0 . . . 1 | RW | A reference (URI) of the ontology used to represent the information that is stored in the instances of the container. |

Figure 12:
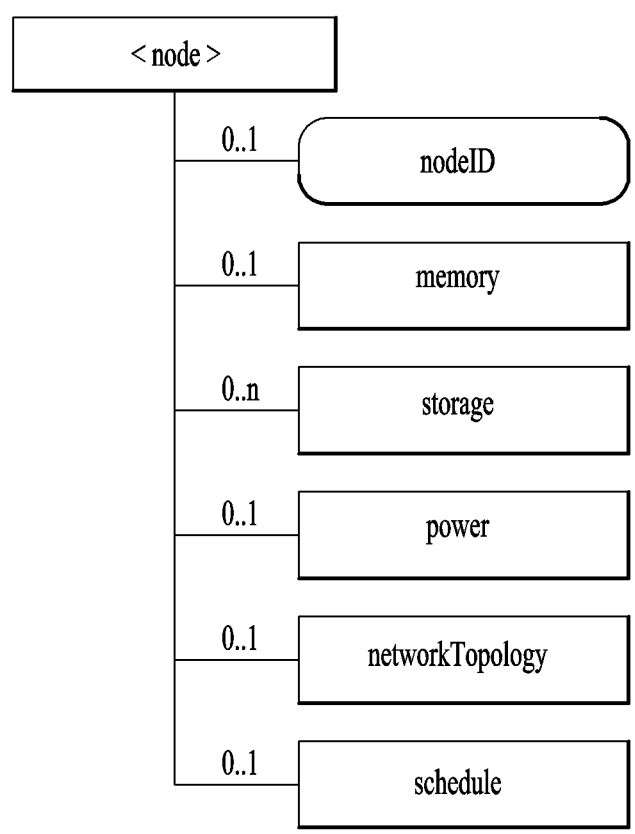
FIG. 12 exemplarily illustrates the resource for storing attribute information of a M2M device according to the present invention.

FIG. 12 exemplarily illustrates the resource for storing attribute information of a M2M device according to the present invention. Although the resource for storing attribute information of the M2M device is referred to as a <node> resource, it should be noted that another name may be used for the resource.

The <node> resource may include specific information of a M2M device that may be used by other M2M operations. For example, CMDH CSF may determine when the request message will be sent to a target CSE on the basis of the reachability schedule of the target CSE. The <node> resource may include information such as network topology of several devices connected to the M2M gateway, when the device represented by the reachability schedule, context information (e.g., memory and storage), and the node resource is a M2M gateway. The <node> resource may include information of a The <node> resource location may be changed according to a device type. For example, the <node> resource for a M2M device (ASN) may be located below a root (e.g., <baseURI>) of a local CSE. In addition, for example, the <node> resource for a constrained M2M device (ADN) may be located below the <Application> resource of the hosting CSE. In addition, for example, the <node> resource for a M2M gateway (MN) may be located below the root (e.g., <baseURI>) of the local CSE.

Table 3 exemplarily illustrates child resources that the <node> resource may have. In Table 3, "multiplicity" of Table 3 may represent how many times the corresponding resource can occur in the <node> resource. Table 3 is only exemplary, and attributes of the <node> resource may be different from those of Table 3 as necessary.

TABLE 3

| Child Resource Name of <node> | Multiplicity | Description |
|---|---|---|
| memory | 0.1 | This resource provides the memory (typically RAM) information of the node. (e.g., the amount of total volatile memory) |
| storage_[i] | 0 . . . n | The resource provides the storage (typically flash or disk) information of the node (e.g. the amount of total writable persistent storage). |

TABLE 3-continued

| Child Resource Name of <node> | Multiplicity | Description |
| --- | --- | --- |
| Power | 0 . . . 1 | This resource provides the power information of the node (e.g., remaining battery charge). |
| networkTopology | 0 . . . n | This resource describes the list of Nodes attached behind the MN node and its underlying or physical relation among the nodes in the M2M Area Network This resource is defined in case the node is MN. |
| schedule | 0 . . . 1 | This resource defines the reachability schedule information of the node |

Figure 13:
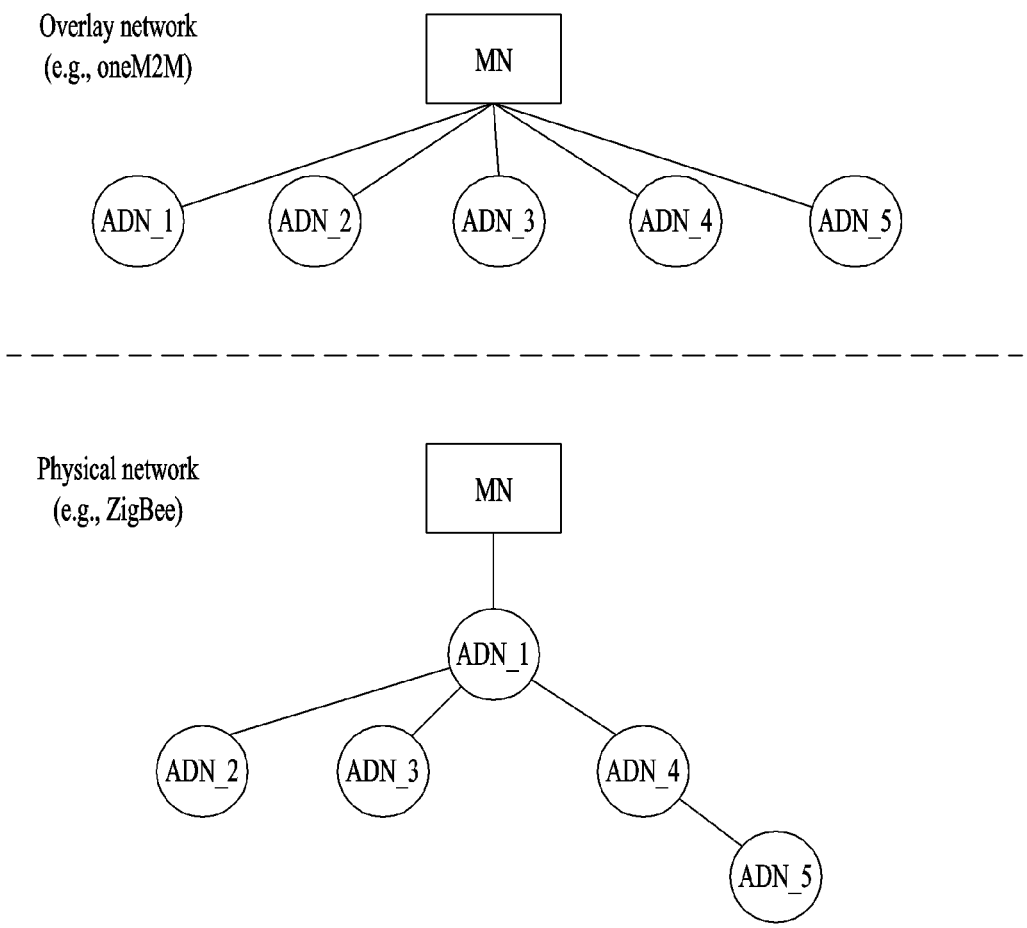
FIG. 13 exemplarily illustrates the network topology.

FIG. 13 exemplarily illustrates the network topology. Although the resource for storing network topology information according to the present invention is referred to as <networkTopology> resource, it should be noted that the resource may also be referred to as other names.

The <networkTopology> resource is a child resource of the <node> resource, and may be defined when the device having the <node> resource is a M2M gateway (MN). The network topology information may represent a list of M2M devices (ASN or ADN) connected to the M2M gateway (MN), and may also describe a physical relation or underlying relation between nodes of the M2M area network. The network topology information may include configuration information of the physically connected M2M area network. The network topology information may be referred to as topology information. The <networkTopology> resource may be used to store network topology information.

Referring to FIG. 13, the relation between nodes is exemplarily shown in terms of an overlay network or a physical network. For example, the overlay network may be a one M2M network, and the physical network may be a ZigBee network. From the viewpoint of the overlay network, respective ADNs (e.g., ADN_1 to ADN_5) may be connected to a MN through the Mca reference point, irrespective of the physical network structure. Therefore, from the viewpoint of the overlay network, each ADN and each MN may be interconnected through a single hop. In contrast, from the viewpoint of the physical network, respective ADNs (e.g., ADN_1 to ADN_5) may be connected in the form of a mesh. Therefore, from the viewpoint of the physical network, ADN_2 may be connected to MN through 2 hops, and ADN_5 may be connected to MN through 4 hops. The network topology information may include configuration information of the physical network, and may represent a connection relationship between actual nodes. Therefore, a <networkTopology> resource may include information for describing the relationship between nodes in terms of the physical network.

The method for obtaining and managing location information of a M2M device in a M2M system will hereinafter be described.

The location common service function (LOC CSF) may allow a plurality of M2M AEs to obtain geographical location information of the M2M nodes (e.g., ASN, MN) so as to implement the location based service. This location information may be requested by the M2M AEs present in a local node or a remote node. LOC CSF may obtain and manage geographical location information upon receiving a request from the M2M AEs present in the local node or the remote node. LOC CSF may interact with at least one of the location server of the underlying network, the GPS module of the M2M device, and information for inferring locations stored in other M2M nodes.

In order to update the location information, the M2M AE may configure the <locationPolicy> resource attributes (e.g., locationSource attribute or locationUpdatePeriod attribute) stored in CSE. Based on the defined attributes, LOC CSF may update the location information using one of the defined interactions. LOC CSF may request the M2M nodes to share/report geographical location information of the M2M nodes or geographical location information of other M2M nodes with a plurality of M2M applications. In addition, LOC CSF may provide means for protecting confidentiality of geographical location information.

The present invention proposes a method for obtaining the location information of a target UE by storing or changing information in a resource (e.g., <locationPolicy> resource) for storing a scheme for obtaining UE location information or in a resource (e.g., <container> resource) for storing location information of the target UE. For example, the present invention defines a method for obtaining the location information of a target UE by creating the <locationPolicy> resource, so that the obtained location information is stored in the <container> resource (or <instance> resource which is a child resource of the <container> resource) of CSE according to the defined method for obtaining the UE location information.

Method for Providing Location Information Acquisition Scheme on the Basis of the <locationPolicy> Resource If an AE desires to obtain location information of a target UE, the AE may create the <locationPolicy> resource in a CSE connected to the AE. In order to create the <locationPolicy> resource, the originator AE may request creating the <locationPolicy> resource including associated attributes and an address of a root resource (e.g., <baseURI>) of a hosting CSE (See FIG. 7 and FIG. 10, the description related thereto). In addition, for example, the create request may include at least one of attributes shown in Table 1.

If the receiver (e.g., the hosting CSE) receives the create request, the receiver may perform the following operations.

may check whether the originator (AE) has the authority to request the create procedure. (Check whether the Originator is authorized to request the procedure).

may check whether attributes provided for the <locationPolicy> resource has a valid request for obtaining and managing location information. (Check whether the provided attributes of the <locationPolicy> resource represent a valid request for obtaining and managing location information).

If the above procedures have been successfully checked, may create the requested <locationPolicy> resource and automatically create <container> in which the actual location information is stored, and child <instance> resources of the <container> resource. (Upon successful validation of the above procedures, create the requested <locationPolicy> resource and automatically creates <container> and its child <instance> resources where the actual location information is stored). The above-mentioned resources may have cross-reference attributes. For example, the cross-reference may be formed between a locationContainerID attribute of the <locationPolicy> resource and a location ID attribute of the <container> resource.

may check a locationUpdatePeriod attribute. (Check the locationUpdatePeriod attribute). For example, if a value of the locationUpdatePeriod attribute is greater than zero '0', the hosting CSE may perform the procedure according to the defined attributes, and may store the result (e.g., location fix, uncertainty, etc.) in the created <container> resource. However, if the locationUpdatePeriod attribute is set to zero '0', the positioning procedure (i.e., the location measurement procedure) may be carried out only when the <container> resource storing the location information is retrieved.

may check a locationSource attribute. The positioning procedure may be performed in different ways according to the locationSource attribute. The locationSource attribute may be configured on the basis of capabilities of the network in which the target UE and the originator having requested the location information are present. If the locationSource attribute is set to any one of network-based, device-based, and sharing-based, and if the locationUpdatePeriod attribute is higher than zero '0', the subsequent steps may be carried out.

The locationSource attribute may be set to any one of the following attributes.

Network-based: The hosting CSE may convert the request received from the originator into the request for the location server according to attributes (e.g., locationTargetID, locationServer, etc.) defined in the <locationPolicy> resource. If one of the attributes (e.g., locationTargetID, locationServer, etc.) cannot be retrieved, the hosting CSE may reject the request using the error code. In addition, the hosting CSE may provide a default value for other parameters of the request for the location server according to a local policy. Thereafter, the location server may perform the positioning procedure in the underlying network, and may return the result of the positioning procedure. The hosting CSE may store the returned location information in the <container> resource. The mechanism used in communication with the location server may be dependent upon the capability of the underlying network and other factors. For example, communication between the hosting CSE and the location server may be based on the mobile location protocol of the OMA (Open Mobile Appliance) or may be based on the OMA RESTful NetAPI for the UE location. In addition, the hosting CSE may repeat the above procedures on the basis of period information (e.g., locationUpdatePeriod attribute). Alternatively, the location server may periodically inform the hosting CSE of the location information on the basis of period information.

Device-based: may be applied to an exemplary case in which an originator is an ASN-AE and a M2M device (ASN) has a location determination capability (e.g., GPS). The hosting CSE may perform the positioning procedure using the location measurement module or technology. For example, if the M2M device (ASN) has the GPS module, ASN-CSE may obtain the location information of the M2M device from the GPS module through an internal interface (e.g., system call). The hosting CSE may repeat the above procedure on the basis of period information (e.g., locationUpdatePeriod attribute).

Sharing-based: may be applied to an exemplary case in which an originator is a constrained M2M device (ADN-AE), a hosting CSE is an MN-CSE of a M2M gateway (MN), and the constrained M2M device (ADN) is a resource constrained node. The resource constrained node may refer to a specific node which does not have both the location decision capability (e.g., GPS) and the network based positioning capability. When the hosting CSE receives a create request, the hosting CSE may collect topology information of a M2M area network using the <node> resource. In addition, the hosting CSE may search for a specific node located closest to the originator from among a plurality of nodes having location information and registered to the hosting CSE. The closest node may be determined by a minimum number of hops on the basis of the collected topology information. If the hosting CSE can find the closest node, the location information of the closest node may be stored as the location information of the originator. If the hosting CSE cannot find the closest node, the location information of the hosting CSE may be stored as the location information of the originator. In this case, the location information may be stored in a <contentInstance> resource located below the <container> resource.

The hosting CSE may receive a response message, and may convert the response message into the other response message to be sent to the originator. If the positioning procedure has failed, the hosting CSE may store the statusCode on the basis of an error code present in a locationStatus attribute of the <locationPolicy> resource. If the hosting CSE obtains the location information because the positioning procedure has been successfully performed, the hosting CSE may store the obtained location information in the <contentInstance> resource located below the <container> resource.

A method for more precisely determining the UE location on the basis of network topology information of a M2M area network (the actual underlying network connected to a gateway) according to the sharing-based scheme will hereinafter be described in detail.

If an MN (hosting CSE) has the topology information of the underlying network in the MN, the MN already knows the physical relationship (or topology information) between nodes connected to the MN. Therefore, if the constrained M2M device (ADN) or other application requests creation of the <locationPolicy> resource and configures the locationSource attribute as the sharing-based scheme, MN may search for the closest node having the location information on the basis of topology information (e.g., <networkTopology> resource) owned by the MN according to the above request, and may configure the location of the detected node as the ADN location. The MN may determine which node has location information on the basis of information of resources owned by the MN.

In the sharing-based scheme, the closest node may be determined to be a node having a minimum number of hops from the originator location. When a new node is attached to a node of the existing network in a network having a tree structure, it may be preferable that the new node be attached to the closest node or the stable node having superior capability from among plural nodes. For example, it may be preferable that the new node be connected to a high RSS (Received Signal Strength) node. Therefore, the network topology information may be preferably used as criteria for indicating proximity between nodes. Therefore, the node having a minimum number of hops on the basis of topology information of the physical network may be determined to be the closest node.

Referring to FIG. 13, ADN_5 may be physically registered as a child node of ADN_4, and ADN_5 may request location information according to the sharing based scheme. In this case, the MN may find a node having a minimum number of hops from AND_5 on the basis of the network topology information of the <node> resource allocated to the MN. Assuming that ADN_3 and ADN_1 are nodes each of which has location information, ADN_3 may be spaced apart from ADN_5 by 3 hops, and ADN_1 may be spaced apart from ADN_5 by 2 hops. Accordingly, the closest node in this example may be set to ADN_1.

It may be impossible to find the closest node through a minimum number of hops. For example, if the same two or more nodes having the same minimum number of hops are present, it may be difficult to determine which one of two or more nodes is the closest node. In this case, additional conditions other than a minimum number of hops may be required. In the present invention, a node having the latest information may be selected as a node (i.e., the closest node) sharing the location information, on the basis of a location information acquisition time allocated to the location information of the corresponding UE (the corresponding location information may be allocated to a resource such as <container> in the overlay region). Since the location information obtained on the basis of the sharing based scheme may not be correct location information of the corresponding UE and also the UE sharing the location information may have mobility, it may be preferable to select the node having the latest location information.

Figure 14:
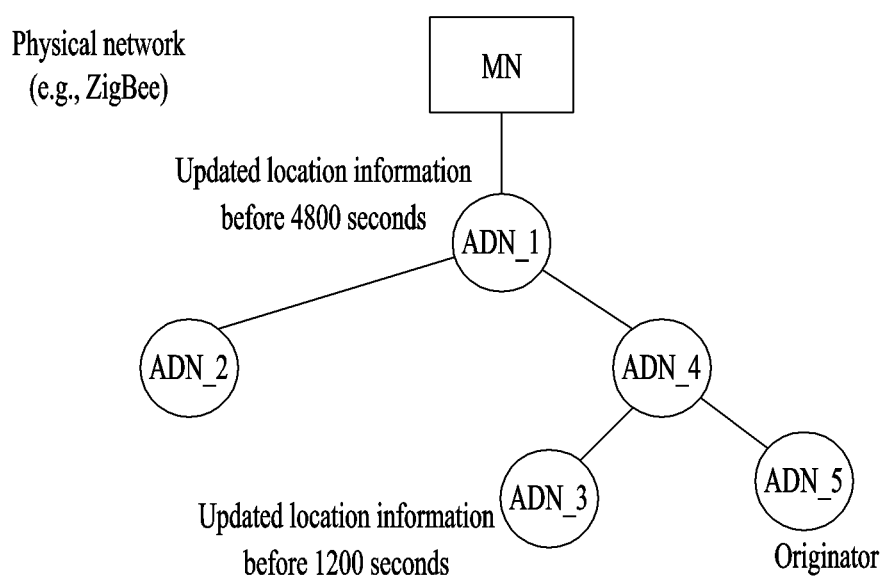
FIG. 14 exemplarily shows an embodiment of the present invention.

FIG. 14 exemplarily shows an embodiment of the present invention. In FIG. 14, it is assumed that ADN_5 requests creation of the <locationPolicy> resource and configures the locationSource attribute as sharing-based. In addition, it is also assumed that each of ADN_1 and ADN_3 has the location information.

Referring to FIG. 14, ADN_1 and ADN_3 may have the same number of hops spaced apart from ADN_5 on the basis of a minimum number of hops. Accordingly, the update time of the location information may be determined as the additional criteria for selecting the closest node. In FIG. 14, it is assumed that ADN_1 has updated location information before 4800 seconds, and ADN_3 has updated location information before 1200 seconds. Therefore, ADN_3 having the latest location information may be determined to be the closest node, and the location information of ADN_3 may be shared/configured as the location information of ADN_5.

If the closest node is decided, a URI including the location information of the closest node may be added as linkage information to the resource including location information of a target UE, and the location information of the closest node may be directly used as the location information of the target UE. If it is impossible for a M2M gateway to find the closest node when the location information is updated, the location information of the M2M gateway may be established as the location information of the target UE. Updating the location information may be carried out using the update operation.

Generally, since a M2M gateway has a limited connection range, the connected UE may have regional proximity. For example, assuming that the connection range of the gateway is a maximum range of 30 m, the UE is basically contained in the radius of 30 m from the gateway location. In this case, it is assumed that the gateway can calculate its own location through the location server or the application.

If the gateway location is shared to a UE and used by the UE, the location information including the above-mentioned error range may be provided. In addition, if the corresponding error range is provided by a service layer to an application, the application may determine whether to use the corresponding information (location information+error range) on the basis of the corresponding information. Since the location information accuracies required by the location based service application (LBS application) are different, the corresponding function can be provided.

Schemes for sharing a location of a M2M gateway will hereinafter be described. It is assumed that a M2M device does not have the function for obtaining location information (based on a location server or based on an application), and it is also assumed that the M2M gateway has the function for obtaining location information. In addition, it is assumed that the M2M gateway and the M2M device are present in the same area network, or it is also assumed that two M2M devices are also present in the same area network when the location information is communicated between the M2M devices.

1) If the M2M Gateway is Stationary

In this case, since the location of the M2M gateway is unchanged, the location of the M2M gateway is provisioned. The provisioning scheme may include a scheme of explicitly reporting location information of the M2M gateway, or a scheme of providing a URI regarding location information of the M2M gateway.

In accordance with the scheme of explicitly reporting the location information, the M2M gateway may provide location information, for example, in the form of latitude and longitude, or 3D structure. In addition, the following additional attribute may be provided along with the location information.

Uncertainty: Uncertainty information may correspond to coverage of the M2M gateway. For example, although the M2M device already knows its own location as the location of the M2M gateway, the M2M device may know that the M2M device is actually present in the coverage (or radius) of the M2M gateway using uncertainty information.

Valid time information: This information may indicate a valid time for the corresponding location. After lapse of the corresponding time, the M2M device must discard the location.

Transmit (Tx) power information: This information may indicate information about transmit power transmitted by the M2M gateway.

Through the corresponding information, the M2M device may perform precise calculation on the basis of RSS (Received Signal Strength) from the M2M gateway.

Hop information: If the area network is configured in the form of a mesh, topology information managed by the M2M gateway may be provided.

2) If the M2M Gateway is Mobile

If the M2M gateway is a mobile type, the location of the M2M gateway may be changed, and thus the location information URI of the M2M gateway may be linked to URI of a location information resource of the target device. In this case, the location of the target device may be identical to the location of the M2M gateway. In addition, if the M2M device is disconnected with the corresponding M2M gateway, the M2M device may delete the corresponding location information.

For example, assuming that the locationSource attribute of the <locationPolicy> resource is set to 'sharing-based' and an AE is disconnected with a MN-CSE, M2M device may request deletion of the <locationPolicy> resource. In this case, the M2M device may transmit a request message for deleting the <locationPolicy> resource to the M2M gateway.

If the receiver (e.g., M2M gateway) receives the above request message, the receiver may check whether the originator (e.g., device) has the DELETE authority for the <locationPolicy> resource. If the check has been successfully performed, CSE may delete the resource from the repository and may transmit the appropriate response to the originator.

Since the location information of the closest node or gateway (MN) has already been stored in the <container> resource, the hosting CSE may store the resource URI in the <container> resource.

The hosting CSE may check or investigate the locationUpdatePeriod attribute. If the locationUpdatePeriod attribute is higher than zero '0', the hosting CSE may perform the procedure according to defined attributes and store the execution result in the <container> resource. However, if the locationUpdatePeriod attribute is set to zero '0' or is not set, the hosting CSE may perform the positioning procedure (location measurement procedure) only when the <container> resource is retrieved at a later time.

FIG. 15 exemplarily illustrates a positioning procedure (location measurement procedure) of a M2M gateway according to the present invention. In FIG. 15, the M2M device may be a device having no location information. For example, the M2M device may correspond to a constrained M2M device (ADN). For example, as can be seen from FIG. 15, it is assumed that the device having location information in a M2M area network is not present. In addition, as shown in the example of FIG. 15, it is assumed that the M2M gateway has coverage of a radius of 30 m.

Referring to FIG. 15(a), if the M2M device requests location information from the M2M gateway, the M2M gateway may determine the presence or absence of location information in the area network. Since there is no device having location information, the M2M gateway may transmit its own location information to the M2M device. In this case, the location information may be denoted by a combination of (latitude, longitude). In addition, the location information may include uncertainty attribute information. In FIG. 15, the location information of the M2M gateway may be denoted by (300, 400), and the coverage is 30 m, such that the location information may be set to "location=(300, 400), uncertainty=30", and then transmitted to the M2M device.

Referring to FIG. 15(b), after the M2M device receives the location information "Location=(300, 400), uncertainty=30", the M2M device may determine that the M2M device is located at the location of the M2M gateway. However, the actual location of the M2M gateway may be different from the location information, and this difference may be estimated through uncertainty information.

FIG. 16 is a flowchart illustrating a positioning procedure (location measurement procedure) according to the present invention. In FIG. 16, it is assumed that M2M device 1610 is an ADN and a resource constrained node. Therefore, M2M device 1610 does not have both a location decision capability (e.g., GPS) and a network-based positioning capability. It is assumed that M2M gateway 1620 has a hosting CSE serving as MN. In addition, it is assumed that M2M device 1630 includes at least one ASN or ADN.

Referring to FIG. 16, M2M gateway 1620 may perform the hosting CSE operations described with reference to the method for providing the location information acquisition scheme on the basis of the <locationPolicy> resource. M2M device 1610 may serve as the originator for requesting the location information.

In step S1602, M2M gateway 1620 may perform the location acquisition procedure, and may obtain the location information of M2M device 1630. M2M gateway 1620 may store the location information of M2M device 1630 in the <container> resource. The <container> resource may have the structure exemplarily shown in FIG. 11, or may have attributes shown in Table 2.

In step S1604, M2M device 1610 may transmit a request to M2M gateway 1620 for creating the <locationPolicy> resource indicating the location information acquisition scheme. The above-mentioned create request may include specific information for indicating the shared-based positioning (e.g., locationSource attribute configured as sharing-based).

In step S1606, M2M gateway 1620 may create the <locationPolicy> resource. The <locationPolicy> resource may have the structure exemplarily shown in FIG. 10, and may include at least one of the attributes shown in Table 1.

In step S1608, M2M gateway 1620 may create the <node> resource and a child resource thereof. The <node> resource may have the structure exemplarily shown in FIG. 12, and may include at least one of the resources shown in Table 3.

In step S1610, M2M gateway 1620 may construct the network topology information. M2M gateway 1620 may obtain a list of M2M devices connected to M2M gateway 1620, and may obtain information regarding the physical connection or the underlying connection between M2M devices in the M2M area network. The network topology information may indicate the list of M2M devices connected to M2M gateway 1620, or may indicate the physical connection (or the physical connection relationship) between M2M devices in the M2M area network. Step S1608 and/or Step S1610 may also be performed before step S1604. The network topology information may be stored in the <node> resource created in step S1608.

In step S1612, M2M gateway 1620 may search for the M2M device located closest to M2M device 1610 on the basis of topology information and location information.

If M2M gateway 1620 does not have topology information or cannot find the closest M2M device, the location information of M2M gateway 1620 may be stored as the location information of M2M device 1610. In this case, M2M gateway 1620 may store its own location information as the location information of M2M device 1610.

In contrast, if M2M gateway 1620 has topology information and can find a device having a minimum number of hops spaced apart from M2M device 1610 from among a plurality of devices having location information based on the topology information, the device having a minimum number of hops may be determined to be the closest device. In this case, M2M gateway 1620 may store the location information of the M2M device determined to be the closest device as the location information of M2M device 1610. In addition, assuming that several devices having the same minimum number of hops are decided, the device having the latest location information may be determined to be the closest device.

The example of FIG. 16 is only exemplary, and some steps may be omitted or additional steps may be added according to the implementation example. In addition, the embodiments proposed by the present invention are combined so that a new embodiment can be proposed, and only some constituent elements of the embodiments are combined so that a new embodiment can be formed as necessary.

Figure 17:
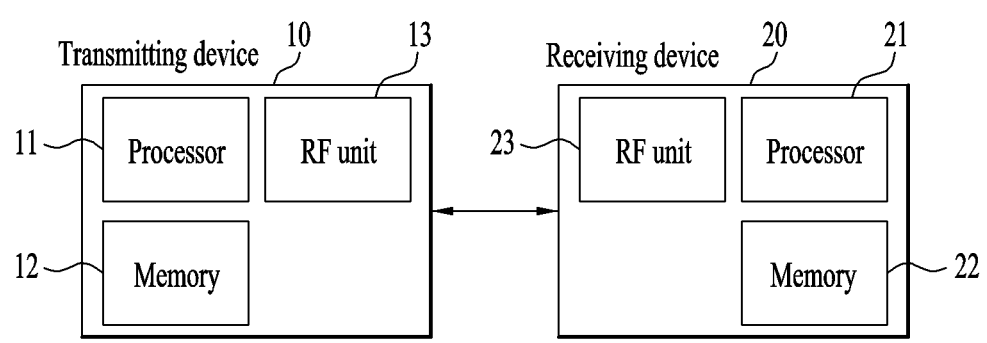
FIG. 17 illustrates a block diagram of a device according to embodiment(s) of the present invention.

FIG. 17 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 14 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

The invention claimed is:

1. A method for obtaining location information of a machine-to-machine (M2M) device by a M2M gateway, the method comprising:
   receiving a create request from a first M2M device, the create request for creating a first resource indicating a scheme of obtaining location information;
   searching for a device closest to the first M2M device based on network topology information, when the create request includes information indicating sharing-based location measurement;
   when the device closest to the first M2M device is found, storing location information of the closest device as location information of the first M2M device; and
   when the device closest to the first M2M device is not found, storing location information of the M2M gateway as the location information of the first M2M device.

2. The method according to claim 1, wherein the searching for the device closest to the first M2M device includes:
   searching for the closest device using a minimum number of hops based on the network topology information.

3. The method according to claim 1, wherein the storing the location information of the closest device includes:

storing the location information of the closest device in a second resource for storing the location information of the first M2M device.

4. The method according to claim 1, wherein the storing the location information of the M2M gateway includes:
   storing the location information of the M2M gateway in a second resource for storing the location information of the first M2M device.

5. The method according to claim 1, wherein the network topology information is constructed based on a list of M2M devices connected to the M2M gateway.

6. The method according to claim 1, wherein the sharing-based location measurement is applied when the first M2M device does not have a positioning determination capability and a network-based positioning capability.

7. The method according to claim 1, wherein the sharing-based location measurement represents obtaining the location information of the first M2M device from the M2M gateway.

8. The method according to claim 1, wherein the first resource corresponds to a data structure that is uniquely addressable using address information.

9. The method according to claim 1, wherein if there are at least two devices having a minimum number of hops, a device having a latest location information is determined as the device located closest to the first M2M device.

10. A machine-to-machine (M2M) gateway configured to obtain location information of a M2M device, the M2M gateway comprising:
    a network interface unit; and
    a processor configured to:
    receive a create request from a first M2M device, the create request for creating a first resource indicating a scheme of obtaining location information,
    search for a device closest to the first M2M device based on network topology information when the create request includes information indicating sharing based location measurement,
    when the device closest to the first M2M device is found, store location information of the closest device as location information of the first M2M device, and
    when the device closest to the first M2M device is not found, store location information of the M2M gateway as the location information of the first M2M device.

11. The M10M gateway according to claim 10, wherein the searching for the device closest to the first M2M device includes:
    searching for the closest device using a minimum number of hops based on the network topology information.

12. The M10M gateway according to claim 10, wherein the storing the location information of the closest device includes:
    storing the location information of the closest device in a second resource for storing the location information of the first M2M device.

13. The M2M gateway according to claim 10, wherein the storing the location information of the M2M gateway includes:
    storing the location information of the M2M gateway in a second resource for storing the location information of the first M2M device.

14. The M2M gateway according to claim 10, wherein the network topology information is constructed based on a list of M2M devices connected to the M2M gateway.

15. The M2M gateway according to claim 10, wherein the sharing-based location measurement is applied when the first M2M device does not have a positioning determination capability and a network-based positioning capability.

16. The M2M gateway according to claim 10, wherein the sharing-based location measurement represents obtaining the location information of the first M2M device from the M2M gateway.

17. The M2M gateway according to claim 10, wherein the first resource corresponds to a data structure that is uniquely addressable using address information.

18. The M2M gateway according to claim 10, wherein if there are at least two devices having a minimum number of hops, a device having a latest location information is determined as the device located closest to the first M2M device.

* * * * *